US 12,473,174 B2

(12) United States Patent
Nurminen et al.

(10) Patent No.: US 12,473,174 B2
(45) Date of Patent: Nov. 18, 2025

(54) DETERMINING FLOOR NAME BASED ON AUDIO AND/OR VISUAL SAMPLES

(71) Applicant: HERE Global B.V., Eindhoven (NL)

(72) Inventors: Henri Jaakko Julius Nurminen, Tampere (FI); Pavel Ivanov, Tampere (FI); Lauri Aarne Johannes Wirola, Tampere (FI)

(73) Assignee: HERE Global B.V., Eindhoven (NL)

( * ) Notice: Subject to any disclaimer, the term of this patent is extended or adjusted under 35 U.S.C. 154(b) by 1429 days.

(21) Appl. No.: 17/076,289

(22) Filed: Oct. 21, 2020

(65) Prior Publication Data
US 2022/0119223 A1  Apr. 21, 2022

(51) Int. Cl.
*B66B 1/34* (2006.01)
*B66B 1/36* (2006.01)
*B66B 1/46* (2006.01)
*G06N 20/00* (2019.01)

(52) U.S. Cl.
CPC ............ *B66B 1/468* (2013.01); *B66B 1/3461* (2013.01); *B66B 1/36* (2013.01); *G06N 20/00* (2019.01); *B66B 2201/103* (2013.01); *B66B 2201/4615* (2013.01); *B66B 2201/4646* (2013.01); *B66B 2201/4653* (2013.01)

(58) Field of Classification Search
CPC ......... B66B 1/468; B66B 1/36; B66B 1/3461; G06N 20/00
USPC ........................................................ 187/380
See application file for complete search history.

(56) References Cited

U.S. PATENT DOCUMENTS

| 6,615,175 | B1 * | 9/2003 | Gazdzinski | B66B 3/006 704/E15.045 |
| 7,093,693 | B1 * | 8/2006 | Gazdzinski | B66B 3/00 340/5.2 |
| 7,711,565 | B1 * | 5/2010 | Gazdzinski | B66B 1/468 369/30.01 |
| 9,664,520 | B2 | 5/2017 | Do | |
| 10,560,809 | B2 | 2/2020 | Lim | |

(Continued)

FOREIGN PATENT DOCUMENTS

CN  106705953 A  5/2017

OTHER PUBLICATIONS

Pipelidis et al., *A Novel Approach for Dynamic Vertical Indoor Mapping Through Crowd-sourced Smartphone Sensor Data*, Technical Universty of Munich Software and Systems Engineering Research Group, Munich Germany, ResearchGate Conference Paper— Sep. 2017 (9 pages).

*Primary Examiner* — Erick D Glass
(74) *Attorney, Agent, or Firm* — Alston & Bird LLP

(57) ABSTRACT

A processor obtains an audio sample captured by an audio sensor associated with a device and/or image data captured by an image sensor associated with the device. The image data comprises a representation of one or more elevator buttons. The processor analyzes the audio sample to identify a floor name indicator in the audio sample and/or the image data to identify an activated elevator button from among the one or more elevator buttons represented by the image data; and determines a floor name based on the floor name indicator identified in the analyzed audio sample and/or a floor name indicator associated with the identified activated elevator button in accordance with the analyzed image data. The processor causes the determined floor name to be stored and/or provided for positioning purposes.

20 Claims, 9 Drawing Sheets

(56) References Cited

U.S. PATENT DOCUMENTS

| | | |
|---|---|---|
| 2013/0101163 A1 | 4/2013 | Gupta et al. |
| 2018/0066953 A1 | 3/2018 | Kimia |
| 2020/0068349 A1 | 2/2020 | Huberman et al. |
| 2022/0124456 A1* | 4/2022 | Nurminen ........... G01S 5/02522 |

* cited by examiner

DETERMINING FLOOR NAME BASED ON AUDIO AND/OR VISUAL SAMPLES

TECHNOLOGICAL FIELD

An example embodiment relates generally to positioning. In particular, an example embodiment generally relates to indoor positioning and/or positioning within a venue comprising multiple floors or levels.

BACKGROUND

When performing indoor positioning and/or positioning at a venue comprising multiple floors or levels, it may be desired to provide the vertical position (e.g., to a user) as a floor name rather than as an altitude or elevation. However, the floor names in different buildings and/or venues may not be consistent. Given the large number of buildings and/or venues in existence, manual determination and entry of floor names for individual buildings and/or venues is untenable.

BRIEF SUMMARY

Various embodiments provide methods, apparatus, systems, and computer program products for generating positioning maps and/or venue maps that include floor names for floors and/or levels at one or more horizontal reference positions. As used herein, the term floor name refers to the human-readable identifier of the floor that is used, for example, in guidance signs, staircases, elevators, and/or indoor maps of the building. Some non-limiting examples include "B2", "B1", "G", "F1", "F2", "F3". In various embodiments, a discrete vertical axis may be defined at a horizontal reference position with the levels of the discrete vertical axis being labeled by the corresponding floor names present at the horizontal reference position. For example, the horizontal reference position may be located within a building or venue and the levels of the corresponding discrete vertical axis may be labeled based on the floor names of the building or venue. In an example embodiment, a continuous vertical axis may also be defined for the horizontal reference position with the continuous vertical axis labeled and/or corresponding to altitude. In various embodiments, a floor name—altitude relation may be defined for the horizontal reference position that enables transformation, mapping, and/or the like between points on the continuous vertical axis and levels on the discrete vertical axis, and/or between levels on the discrete vertical axis and a point or section (e.g., range of values) on the continuous vertical axis. In various embodiments, sensor fingerprints may be associated with levels of the discrete vertical axis and/or points of the continuous vertical axis at the horizontal reference position such that positioning based on sensor fingerprints may be enabled by the positioning and/or venue map.

Various embodiments provide methods, apparatus, systems, and computer program products for determining the floor names for floors and/or levels at one or more horizontal reference positions based on audio and/or visual samples. For example, in various embodiments, user devices may capture audio and/or visual samples (e.g., image data) that may include one or more floor names. For example, a visual sample may comprise image data corresponding to a digital image of floor buttons in an elevator. For example, an audio sample may comprise audio data corresponding to a recording of an automated elevator voice announcing a floor. In various embodiments, the audio and/or visual sample is analyzed to identify a floor name within the sample. For example, a floor name extraction model may be trained (e.g., using machine learning) and/or generated and used to analyze audio and/or visual samples to identify floor name indicators within the samples. Based on the identified floor name indicators, the floor names of a corresponding building may be determined such that a positioning map or a venue map may be generated, annotated, and/or the like to include the floor names. Thus, positioning may be performed where the vertical location is provided as a floor name that corresponds to the floor names of the building and/or venue located at the corresponding horizontal reference position.

Various embodiments provide methods, apparatus, systems, and computer program products for using a positioning map that includes floor names for floors and/or levels at one or more horizontal reference positions to determine location estimates. For example, a user device, mobile device, internet of things (IoT) device, and/or other device may capture a sensor fingerprint. A positioning map may then be queried based at least in part on the sensor fingerprint to determine a three dimensional position estimate of the device. In an example embodiment, the three dimensional position estimate of the device provides the vertical component of the device's location as a floor name. For example, a first position estimate may be determined based on the discrete vertical axis associated with the horizontal reference position based on the sensor fingerprint. A second position estimate may be determined based on the continuous vertical axis associated with the horizontal reference position based on the sensor fingerprint and the floor name—altitude relation for the horizontal reference position. In instances where the first and second position estimate are in agreement (e.g., the first position estimate and the second position estimate indicate the same floor), a location estimate for the device is determined and/or generated and provided. In instances where the first and second position estimate are not in agreement (e.g., the first position estimate and the second position estimate indicate two different floors), an error may be generated and/or one of the first position estimate or the second position estimate may be selected (e.g., based on a confidence measure and/or the like) for use in generating and/or determining the location estimate for the device. The location estimate may be used to perform one or more positioning and/or navigation-related functions, in various embodiments.

In an example embodiment, a network devices receives a plurality of data samples associated with at least one horizontal reference position. Each data sample respectively comprises (i) one or more measurements associated with a respective device, and (ii) a vertical component of a location. The vertical component is provided as at least one of (1) an altitude of the respective device when the one or more measurements were obtained or (2) a floor name for a building floor at which the respective device was located when the one or more measurements were obtained. The network device identifies at least one of (i) a first set of data samples of the plurality of data samples or (ii) a second set of data samples of the plurality of data samples. Each data sample in the first set of data samples comprises the floor name for the building floor at which the respective device was located on when the one or more measurements were obtained. Each data sample in the second set of data samples comprises both (1) the altitude of the respective device when the one or more measurements were obtained and (2) the floor name for the building floor at which the respective device was located on when the one or more measurements were obtained. Based on the at least one of (i) the first set of data samples or (ii) the second set of data samples, the network device determines at least one of (a) a discrete vertical axis associated with the at least one horizontal reference position with levels of the discrete vertical axis labeled by corresponding floor names for the at least one horizontal reference position or (b) a floor name—altitude relation for the at least one horizontal reference position.

In an example embodiment, a processor receives a positioning request comprising a sensor fingerprint captured by a device. The processor generates at least one position estimate based on at least one of (a) a discrete vertical axis associated with a horizontal reference position or (b) a continuous vertical axis associated with the horizontal reference position and a floor name—altitude relation for the horizontal reference position. The at least one position estimate comprises a floor name for a floor on which the device was located when the device captured the sensor fingerprint. The processor generates a location estimate for the device based at least in part on the at least one position estimate; and provides the location estimate.

In an example embodiment, one or more processors obtain one or more of (i) an audio sample captured by an audio sensor associated with a device or (ii) image data captured by an image sensor associated with the device, the image data comprising a representation of one or more elevator buttons. The one or more processors analyze one or more of (i) the audio sample to identify a floor name indicator in the audio sample or (ii) the image data to identify an activated elevator button from among the one or more elevator buttons represented by the image data. The one or more processors determine a floor name based on one or more of the following: (i) the floor name indicator identified in the analyzed audio sample or (ii) a floor name indicator associated with the identified activated elevator button in accordance with the analyzed image data. The one or more processors cause the determined floor name to be stored and/or provided for positioning purposes.

According to a first aspect of the present disclosure, a method for generating, determining, updating, and/or the like a positioning map is provided. In an example embodiment, the method comprises receiving, by a network device, a plurality of data samples associated with at least one horizontal reference position. Each data sample respectively comprises (i) one or more measurements associated with a respective device, and (ii) a vertical component of a location, The vertical component is provided as at least one of (1) an altitude of the respective device when the one or more measurements were obtained or (2) a floor name for a building floor at which the respective device was located when the one or more measurements were obtained. The method further comprises identifying, by the network device, at least one of (i) a first set of data samples of the plurality of data samples or (ii) a second set of data samples of the plurality of data samples. Each data sample in the first set of data samples comprises the floor name for the building floor at which the respective device was located on when the one or more measurements were obtained and each data sample in the second set of data samples comprises both (1) the altitude of the respective device when the one or more measurements were obtained and (2) the floor name for the building floor at which the respective device was located on when the one or more measurements were obtained. The method further comprises determining, by the network device and based on the at least one of (i) the first set of data samples or (ii) the second set of data samples, at least one of (a) a discrete vertical axis associated with the at least one horizontal reference position with levels of the discrete vertical axis labeled by corresponding floor names for the at least one horizontal reference position or (b) a floor name—altitude relation for the at least one horizontal reference position.

In an example embodiment, the method further comprises, defining, for the at least one horizontal reference position, a continuous vertical axis corresponding to altitude based at least in part on a third set of data samples identified from the plurality of data samples, wherein each data sample in the third set of data samples comprises the altitude of the respective device when the one or more measurements were obtained. In an example embodiment, at least one of the discrete vertical axis or the continuous vertical axis is associated with one or more positioning maps. In an example embodiment, the floor name—altitude relation provides a relationship between levels of the discrete vertical axis and the continuous vertical axis. In an example embodiment, a data sample comprises a sensor fingerprint corresponding to the at least one horizontal reference position and indicating one or more measurements captured by a sensor associated with the device, the method further comprising associating the sensor fingerprint with a respective portion of at least one of the discrete vertical axis or a continuous vertical axis defined for the at least one horizontal reference position. In an example embodiment, at least one data sample comprises a horizontal plane component of the location indicating a two dimensional location of the respective device when the respective one or more measurements were obtained and wherein the association of the data sample to the at least one horizontal reference position is determined based on the horizontal plane component of the location. In an example embodiment, the method further comprises determining a horizontal plane component of the location indicating a two dimensional location of the respective device when the respective one or more measurements were obtained based at least in part on the respective one or more measurements and a positioning map and wherein the association of the data sample to the at least one horizontal reference position is determined based on the horizontal plane component of the location. In an example embodiment, a grid comprising a plurality of horizontal reference positions is defined, the plurality of horizontal reference positions comprising the at least one horizontal reference position, and two or more horizontal reference positions are each associated with at least one of (i) a respective discrete vertical axis, (ii) a respective continuous vertical axis, or (iii) a respective floor name—altitude relation. In an example embodiment, a particular horizontal reference position of the plurality of horizontal reference positions corresponds to a building footprint corresponding to a particular building and the floor names of the discrete vertical axis defined for the particular horizontal reference position are floor names of the particular building. In an example embodiment, the method further comprises annotating a map of the building or a portion of a map of a geographical area, the portion of the map corresponding to the at least one horizontal reference position, with the floor names based at least in part on at least one of the discrete vertical axis or the floor name—altitude relation.

According to another aspect of the present disclosure, an apparatus is provided. In an example embodiment, the apparatus comprises at least one processor and at least one memory storing computer program code. The at least one memory and the computer program code are configured to, with the processor, cause the apparatus to at least receive a plurality of data samples associated with at least one horizontal reference position. Each data sample respectively comprises (i) one or more measurements associated with a respective device, and (ii) a vertical component of a location, The vertical component is provided as at least one of (1) an altitude of the respective device when the one or more measurements were obtained or (2) a floor name for a building floor at which the respective device was located when the one or more measurements were obtained. The at least one memory and the computer program code are further configured to, with the processor, cause the apparatus to at least identify at least one of (i) a first set of data samples of the plurality of data samples or (ii) a second set of data samples of the plurality of data samples. Each data sample in the first set of data samples comprises the floor name for the building floor at which the respective device was located on when the one or more measurements were obtained and each data sample in the second set of data samples comprises both (1) the altitude of the respective device when the one or more measurements were obtained and (2) the floor name for the building floor at which the respective device was located on when the one or more measurements were obtained. The at least one memory and the computer program code are further configured to, with the processor, cause the apparatus to at least determine, based on the at least one of (i) the first set of data samples or (ii) the second set of data samples, at least one of (a) a discrete vertical axis associated with the at least one horizontal reference position with levels of the discrete vertical axis labeled by corresponding floor names for the at least one horizontal reference position or (b) a floor name—altitude relation for the at least one horizontal reference position.

In an example embodiment, the at least one memory and the computer program code are further configured to, with the processor, cause the apparatus to define, for the at least one horizontal reference position, a continuous vertical axis corresponding to altitude based at least in part on a third set of data samples identified from the plurality of data samples, wherein each data sample in the third set of data samples comprises the altitude of the respective device when the one or more measurements were obtained. In an example embodiment, at least one of the discrete vertical axis or the continuous vertical axis is associated with one or more positioning maps. In an example embodiment, the floor name—altitude relation provides a relationship between levels of the discrete vertical axis and the continuous vertical axis. In an example embodiment, a data sample comprises a sensor fingerprint corresponding to the at least one horizontal reference position and indicating one or more measurements captured by a sensor associated with the device, the method further comprising associating the sensor fingerprint with a respective portion of at least one of the discrete vertical axis or a continuous vertical axis defined for the at least one horizontal reference position. In an example embodiment, at least one data sample comprises a horizontal plane component of the location indicating a two dimensional location of the respective device when the respective one or more measurements were obtained and wherein the association of the data sample to the at least one horizontal reference position is determined based on the horizontal plane component of the location. In an example embodiment, the at least one memory and the computer program code are further configured to, with the processor, cause the apparatus to determine a horizontal plane component of the location indicating a two dimensional location of the respective device when the respective one or more measurements were obtained based at least in part on the respective one or more measurements and a positioning map and wherein the association of the data sample to the at least one horizontal reference position is determined based on the horizontal plane component of the location. In an example embodiment, a grid comprising a plurality of horizontal reference positions is defined, the plurality of horizontal reference positions comprising the at least one horizontal reference position, and two or more horizontal reference positions are each associated with at last one of (i) a respective discrete vertical axis, (ii) a respective continuous vertical axis, or (iii) a respective floor name—altitude relation. In an example embodiment, a particular horizontal reference position of the plurality of horizontal reference positions corresponds to a building footprint corresponding to a particular building and the floor names of the discrete vertical axis defined for the particular horizontal reference position are floor names of the particular building. In an example embodiment, the at least one memory and the computer program code are further configured to, with the processor, cause the apparatus to annotate a map of the building or a portion of a map of a geographical area, the portion of the map corresponding to the at least one horizontal reference position, with the floor names based at least in part on at least one of the discrete vertical axis or the floor name—altitude relation.

In still another aspect of the present disclosure, a computer program product is provided. In an example embodiment, the computer program product comprises at least one non-transitory computer-readable storage medium having computer-readable program code portions stored therein. The computer-readable program code portions comprise executable portions configured, when executed by a processor of an apparatus, to cause the apparatus to receive a plurality of data samples associated with at least one horizontal reference position. Each data sample respectively comprises (i) one or more measurements associated with a respective device, and (ii) a vertical component of a location, The vertical component is provided as at least one of (1) an altitude of the respective device when the one or more measurements were obtained or (2) a floor name for a building floor at which the respective device was located when the one or more measurements were obtained. The computer-readable program code portions comprise executable portions further configured, when executed by a processor of an apparatus, to cause the apparatus to identify at least one of (i) a first set of data samples of the plurality of data samples or (ii) a second set of data samples of the plurality of data samples. Each data sample in the first set of data samples comprises the floor name for the building floor at which the respective device was located on when the one or more measurements were obtained and each data sample in the second set of data samples comprises both (1) the altitude of the respective device when the one or more measurements were obtained and (2) the floor name for the building floor at which the respective device was located on when the one or more measurements were obtained. The computer-readable program code portions comprise executable portions further configured, when executed by a processor of an apparatus, to cause the apparatus to determine, based on the at least one of (i) the first set of data samples or (ii) the second set of data samples, at least one of (a) a discrete vertical axis associated with the at least one horizontal reference position with levels of the discrete vertical axis labeled by corresponding floor names for the at least one horizontal reference position or (b) a floor name—altitude relation for the at least one horizontal reference position.

In an example embodiment, the computer-readable program code portions comprise executable portions further configured, when executed by a processor of an apparatus, to cause the apparatus to define, for the at least one horizontal reference position, a continuous vertical axis corresponding to altitude based at least in part on a third set of data samples identified from the plurality of data samples, wherein each data sample in the third set of data samples comprises the altitude of the respective device when the one or more measurements were obtained. In an example embodiment, at least one of the discrete vertical axis or the continuous vertical axis is associated with one or more positioning maps. In an example embodiment, the floor name—altitude relation provides a relationship between levels of the discrete vertical axis and the continuous vertical axis. In an example embodiment, a data sample comprises a sensor fingerprint corresponding to the at least one horizontal reference position and indicating one or more measurements captured by a sensor associated with the device, the method further comprising associating the sensor fingerprint with a respective portion of at least one of the discrete vertical axis or a continuous vertical axis defined for the at least one horizontal reference position. In an example embodiment, at least one data sample comprises a horizontal plane component of the location indicating a two dimensional location of the respective device when the respective one or more measurements were obtained and wherein the association of the data sample to the at least one horizontal reference position is determined based on the horizontal plane component of the location. In an example embodiment, the computer-readable program code portions comprise executable portions further configured, when executed by a processor of an apparatus, to cause the apparatus to determine a horizontal plane component of the location indicating a two dimensional location of the respective device when the respective one or more measurements were obtained based at least in part on the respective one or more measurements and a positioning map and wherein the association of the data sample to the at least one horizontal reference position is determined based on the horizontal plane component of the location. In an example embodiment, a grid comprising a plurality of horizontal reference positions is defined, the plurality of horizontal reference positions comprising the at least one horizontal reference position, and two or more horizontal reference positions are each associated with at least one of (i) a respective discrete vertical axis, (ii) a respective continuous vertical axis, or (iii) a respective floor name—altitude relation. In an example embodiment, a particular horizontal reference position of the plurality of horizontal reference positions corresponds to a building footprint corresponding to a particular building and the floor names of the discrete vertical axis defined for the particular horizontal reference position are floor names of the particular building. In an example embodiment, the computer-readable program code portions comprise executable portions further configured, when executed by a processor of an apparatus, to cause the apparatus to annotate a map of the building or a portion of a map of a geographical area, the portion of the map corresponding to the at least one horizontal reference position, with the floor names based at least in part on at least one of the discrete vertical axis or the floor name—altitude relation.

According to yet another aspect of the present disclosure, an apparatus is provided. In an example embodiment, the apparatus comprises means for receiving a plurality of data samples. Each data sample respectively comprises (i) one or more measurements associated with a respective device, and (ii) a vertical component of a location, The vertical component is provided as at least one of (1) an altitude of the respective device when the one or more measurements were obtained or (2) a floor name for a building floor at which the respective device was located when the one or more measurements were obtained. The apparatus comprises means for identifying at least one of (i) a first set of data samples of the plurality of data samples or (ii) a second set of data samples of the plurality of data samples. Each data sample in the first set of data samples comprises the floor name for the building floor at which the respective device was located on when the one or more measurements were obtained and each data sample in the second set of data samples comprises both (1) the altitude of the respective device when the one or more measurements were obtained and (2) the floor name for the building floor at which the respective device was located on when the one or more measurements were obtained. The apparatus comprises means for determining, based on the at least one of (i) the first set of data samples or (ii) the second set of data samples, at least one of (a) a discrete vertical axis associated with the at least one horizontal reference position with levels of the discrete vertical axis labeled by corresponding floor names of the building containing the at least one horizontal reference position or (b) a floor name—altitude relation for the at least one horizontal reference position.

According to another aspect of the present disclosure, a method for providing a location estimate that includes a floor name is provided. In an example embodiment, the method comprises receiving, by a processor, a positioning request comprising a sensor fingerprint captured by a device; and generating, by the processor, at least one position estimate based on at least one of (a) a discrete vertical axis associated with a horizontal reference position or (b) a continuous vertical axis associated with the horizontal reference position and a floor name—altitude relation for the horizontal reference position. The at least one position estimate comprises a floor name for a floor on which the device was located when the device captured the sensor fingerprint. The method further comprises generating, by the processor, a location estimate for the device based at least in part on the at least one position estimate; and providing, by the processor, the location estimate.

In an example embodiment, the at least one position estimate comprises a first position estimate and a second position estimate, the first position estimate is generated based on the discrete vertical axis associated with the horizontal reference position, the second position estimate is generated based on the continuous vertical axis associated with the horizontal reference position and the floor name—altitude relation for the horizontal reference position, and the location estimate is generated based on a result of comparing the first position estimate and the second position estimate. In an example embodiment, the method further comprises determining, by the processor, whether the first position estimate matches the second position estimate, wherein the location estimate is generated or provided responsive to determining that the first position estimate matches the second position estimate. In an example embodiment, the location estimate is provided (a) such that the device receives the location estimate, (b) as input to a positioning-related or navigation-related function, or (c) both (a) and (b). In an example embodiment, the method further comprises determining the horizontal reference position based on at least one of (a) the sensor fingerprint or (b) a two-dimensional location estimate provided in the positioning request. In an example embodiment, the at least one position estimate is generated by querying a positioning map comprising a discrete vertical axis based at least in part on the sensor fingerprint. In an example embodiment, the sensor fingerprint comprises one or more of an identifier of one or more radio nodes that transmitted radio signals observed by a sensor of the device, or at least one signal parameter of one or more radio signals observed by the sensor of the device. In an example embodiment, the positioning request comprises information indicating an approximate position of the device. In an example embodiment, (a) the processor is a component of the device or (b) the processor is a component of a network device and the position request is received and the location estimate is provided via a communication interface of the network device. In an example embodiment, the location estimate comprises a horizontal plane component.

According to another aspect of the present disclosure, an apparatus is provided. In an example embodiment, the apparatus comprises at least one processor and at least one memory storing computer program code. The at least one memory and the computer program code are configured to, with the processor, cause the apparatus to at least receive a positioning request comprising a sensor fingerprint captured by a device; and generate at least one position estimate based on at least one of (a) a discrete vertical axis associated with a horizontal reference position or (b) a continuous vertical axis associated with the horizontal reference position and a floor name—altitude relation for the horizontal reference position. The at least one position estimate comprises a floor name for a floor on which the device was located when the device captured the sensor fingerprint. The at least one memory and the computer program code are further configured to, with the processor, cause the apparatus to at least generate a location estimate for the device based at least in part on the at least one position estimate; and provide the location estimate.

In an example embodiment, the at least one position estimate comprises a first position estimate and a second position estimate, the first position estimate is generated based on the discrete vertical axis associated with the horizontal reference position, the second position estimate is generated based on the continuous vertical axis associated with the horizontal reference position and the floor name—altitude relation for the horizontal reference position, and the location estimate is generated based on a result of comparing the first position estimate and the second position estimate. In an example embodiment, the at least one memory and the computer program code are further configured to, with the processor, cause the apparatus to at least determine whether the first position estimate matches the second position estimate, wherein the location estimate is generated or provided responsive to determining that the first position estimate matches the second position estimate. In an example embodiment, the location estimate is provided (a) such that the device receives the location estimate, (b) as input to a positioning-related or navigation-related function, or (c) both (a) and (b). In an example embodiment, the at least one memory and the computer program code are further configured to, with the processor, cause the apparatus to at least determine the horizontal reference position based on at least one of (a) the sensor fingerprint or (b) a two-dimensional location estimate provided in the positioning request. In an example embodiment, the at least one position estimate is generated by querying a positioning map comprising a discrete vertical axis based at least in part on the sensor fingerprint. In an example embodiment, the sensor fingerprint comprises one or more of an identifier of one or more radio nodes that transmitted radio signals observed by a sensor of the device, or at least one signal parameter of one or more radio signals observed by the sensor of the device. In an example embodiment, the positioning request comprises information indicating an approximate position of the device. In an example embodiment, (a) the apparatus is the device or (b) the apparatus is a network device and the position request is received and the location estimate is provided via a communication interface of the network device. In an example embodiment, the location estimate comprises a horizontal plane component.

In still another aspect of the present disclosure, a computer program product is provided. In an example embodiment, the computer program product comprises at least one non-transitory computer-readable storage medium having computer-readable program code portions stored therein. The computer-readable program code portions comprise executable portions configured, when executed by a processor of an apparatus, to cause the apparatus to receive a positioning request comprising a sensor fingerprint captured by a device; and generate at least one position estimate based on at least one of (a) a discrete vertical axis associated with a horizontal reference position or (b) a continuous vertical axis associated with the horizontal reference position and a floor name—altitude relation for the horizontal reference position. The at least one position estimate comprises a floor name for a floor on which the device was located when the device captured the sensor fingerprint. The computer-readable program code portions comprise executable portions further configured, when executed by a processor of an apparatus, to cause the apparatus to receive generate a location estimate for the device based at least in part on the at least one position estimate; and provide the location estimate.

In an example embodiment, the at least one position estimate comprises a first position estimate and a second position estimate, the first position estimate is generated based on the discrete vertical axis associated with the horizontal reference position, the second position estimate is generated based on the continuous vertical axis associated with the horizontal reference position and the floor name—altitude relation for the horizontal reference position, and the location estimate is generated based on a result of comparing the first position estimate and the second position estimate. In an example embodiment, the computer-readable program code portions comprise executable portions further configured, when executed by a processor of an apparatus, to cause the apparatus to receive determine whether the first position estimate matches the second position estimate, wherein the location estimate is generated or provided responsive to determining that the first position estimate matches the second position estimate. In an example embodiment, the location estimate is provided (a) such that the device receives the location estimate, (b) as input to a positioning-related or navigation-related function, or (c) both (a) and (b). In an example embodiment, the computer-readable program code portions comprise executable portions further configured, when executed by a processor of an apparatus, to cause the apparatus to receive determine the horizontal reference position based on at least one of (a) the sensor fingerprint or (b) a two-dimensional location estimate provided in the positioning request. In an example embodiment, the at least one position estimate is generated by querying a positioning map comprising a discrete vertical axis based at least in part on the sensor fingerprint. In an example embodiment, the sensor fingerprint comprises one or more of an identifier of one or more radio nodes that transmitted radio signals observed by a sensor of the device, or at least one signal parameter of one or more radio signals observed by the sensor of the device. In an example embodiment, the positioning request comprises information indicating an approximate position of the device. In an example embodiment, (a) the apparatus is the device or (b) the apparatus is a network device and the position request is received and the location estimate is provided via a communication interface of the network device. In an example embodiment, the location estimate comprises a horizontal plane component.

According to yet another aspect of the present disclosure, an apparatus is provided. In an example embodiment, the apparatus comprises means for receiving a positioning request comprising a sensor fingerprint captured by a device. The apparatus comprises means for generating at least one position estimate based on at least one of (a) a discrete vertical axis associated with a horizontal reference position or (b) a continuous vertical axis associated with the horizontal reference position and a floor name—altitude relation for the horizontal reference position. The at least one position estimate comprises a floor name for a floor on which the device was located when the device captured the sensor fingerprint. The apparatus comprises means for generating a location estimate for the device based at least in part on the at least one position estimate. The apparatus comprises means for providing, by the processor, the location estimate.

According to another aspect of the present disclosure, a method for determining a floor name for use in positioning-related and/or navigation-related functions based on an audio and/or visual sample is provided. In an example embodiment, the method comprises obtaining, by one or more processors, one or more of (i) an audio sample captured by an audio sensor associated with a device or (ii) image data captured by an image sensor associated with the device. The image data comprises a representation of one or more elevator buttons. The method further comprises analyzing, by the one or more processors, one or more of (i) the audio sample to identify a floor name indicator in the audio sample or (ii) the image data to identify an activated elevator button from among the one or more elevator buttons represented by the image data; and determining, by the one or more processors, a floor name based on one or more of the following: (i) the floor name indicator identified in the analyzed audio sample or (ii) a floor name indicator associated with the identified activated elevator button in accordance with the analyzed image data. The method further comprises storing or providing, by the one or more processors, the determined floor name for positioning purposes.

In an example embodiment, the method further comprises associating the determined floor name with a horizontal reference position associated with a horizontal plane component of a location of the device when the one or more of (i) the audio sample or (ii) the image data was captured. In an example embodiment, the method further comprises providing the determined floor name in association with the horizontal reference position such that a network device receives the floor name in association with the horizontal reference position. In an example embodiment, the analyzing of the audio sample and/or image data is performed using a machine learning trained floor name identification model. In an example embodiment, the method further comprises obtaining a sensor fingerprint captured using a sensor associated with the device at a location where the one or more of (i) the audio sample or (ii) the image data was captured; and associating the sensor fingerprint or a result of analyzing the sensor fingerprint with the determined floor name. In an example embodiment, the method further comprises receiving an altitude of the device at a location where the one or more of (i) the audio sample or (ii) the image data was captured; and associating the altitude with the determined floor name. In an example embodiment, the audio sample comprises audio of an automated elevator voice.

According to still another aspect of the present disclosure, an apparatus is provided. In an example embodiment, the apparatus comprises at least one processor and at least one memory storing computer program code. The at least one memory and the computer program code are configured to, with the processor, cause the apparatus to at least obtain one or more of (i) an audio sample captured by an audio sensor associated with a device or (ii) image data captured by an image sensor associated with the device, the image data comprising a representation of one or more elevator buttons; analyze one or more of (i) the audio sample to identify a floor name indicator in the audio sample or (ii) the image data to identify an activated elevator button from among the one or more elevator buttons represented by the image data; determine a floor name based on one or more of the following: (i) the floor name indicator identified in the analyzed audio sample or (ii) a floor name indicator associated with the identified activated elevator button in accordance with the analyzed image data; and store or provide the determined floor name for positioning purposes.

In an example embodiment, the at least one memory and the computer program code are further configured to, with the processor, cause the apparatus to at least associate the determined floor name with a horizontal reference position associated with a horizontal plane component of a location of the device when the one or more of (i) the audio sample or (ii) the image data was captured. In an example embodiment, the at least one memory and the computer program code are further configured to, with the processor, cause the apparatus to at least provide the determined floor name in association with the horizontal reference position such that a network device receives the floor name in association with the horizontal reference position. In an example embodiment, the analyzing of the audio sample and/or image data is performed using a machine learning trained floor name identification model. In an example embodiment, the at least one memory and the computer program code are further configured to, with the processor, cause the apparatus to at least obtain a sensor fingerprint captured using a sensor associated with the device at a location where the one or more of (i) the audio sample or (ii) the image data was captured; and associate the sensor fingerprint or a result of analyzing the sensor fingerprint with the determined floor name. In an example embodiment, the at least one memory and the computer program code are further configured to, with the processor, cause the apparatus to at least receive an altitude of the device at a location where the one or more of (i) the audio sample or (ii) the image data was captured; and associate the altitude with the determined floor name. In an example embodiment, the audio sample comprises audio of an automated elevator voice.

According to yet another aspect of the present disclosure, a computer program product is provided. In an example embodiment, the computer program product comprises at least one non-transitory computer-readable storage medium having computer-readable program code portions stored therein. The computer-readable program code portions comprise executable portions configured, when executed by a processor of an apparatus, to cause the apparatus to obtain one or more of (i) an audio sample captured by an audio sensor associated with a device or (ii) image data captured by an image sensor associated with the device, the image data comprising a representation of one or more elevator buttons; analyze one or more of (i) the audio sample to identify a floor name indicator in the audio sample or (ii) the image data to identify an activated elevator button from among the one or more elevator buttons represented by the image data; determine a floor name based on one or more of the following: (i) the floor name indicator identified in the analyzed audio sample or (ii) a floor name indicator associated with the identified activated elevator button in accordance with the analyzed image data; and store or provide the determined floor name for positioning purposes.

In an example embodiment, the computer-readable program code portions comprise executable portions configured, when executed by a processor of an apparatus, to cause the apparatus to associate the determined floor name with a horizontal reference position associated with a horizontal plane component of a location of the device when the one or more of (i) the audio sample or (ii) the image data was captured. In an example embodiment, the computer-readable program code portions comprise executable portions configured, when executed by a processor of an apparatus, to cause the apparatus to provide the determined floor name in association with the horizontal reference position such that a network device receives the floor name in association with the horizontal reference position. In an example embodiment, the analyzing of the audio sample and/or image data is performed using a machine learning trained floor name identification model. In an example embodiment, the computer-readable program code portions comprise executable portions configured, when executed by a processor of an apparatus, to cause the apparatus to obtain a sensor fingerprint captured using a sensor associated with the device at a location where the one or more of (i) the audio sample or (ii) the image data was captured; and associate the sensor fingerprint or a result of analyzing the sensor fingerprint with the determined floor name. In an example embodiment the computer-readable program code portions comprise executable portions configured, when executed by a processor of an apparatus, to cause the apparatus to receive an altitude of the device at a location where the one or more of (i) the audio sample or (ii) the image data was captured; and associate the altitude with the determined floor name. In an example embodiment, the audio sample comprises audio of an automated elevator voice.

According to yet another aspect of the present disclosure, an apparatus is provided. In an example embodiment, the apparatus comprises means for obtaining one or more of (i) an audio sample captured by an audio sensor associated with a device or (ii) image data captured by an image sensor associated with the device. The image data comprises a representation of one or more elevator buttons. The apparatus comprises means for analyzing one or more of (i) the audio sample to identify a floor name indicator in the audio sample or (ii) the image data to identify an activated elevator button from among the one or more elevator buttons represented by the image data. The apparatus comprises means for determining a floor name based on one or more of the following: (i) the floor name indicator identified in the analyzed audio sample or (ii) a floor name indicator associated with the identified activated elevator button in accordance with the analyzed image data. The apparatus comprises means for storing and/or providing the determined floor name for positioning purposes.

BRIEF DESCRIPTION OF THE DRAWINGS

Figure 1:
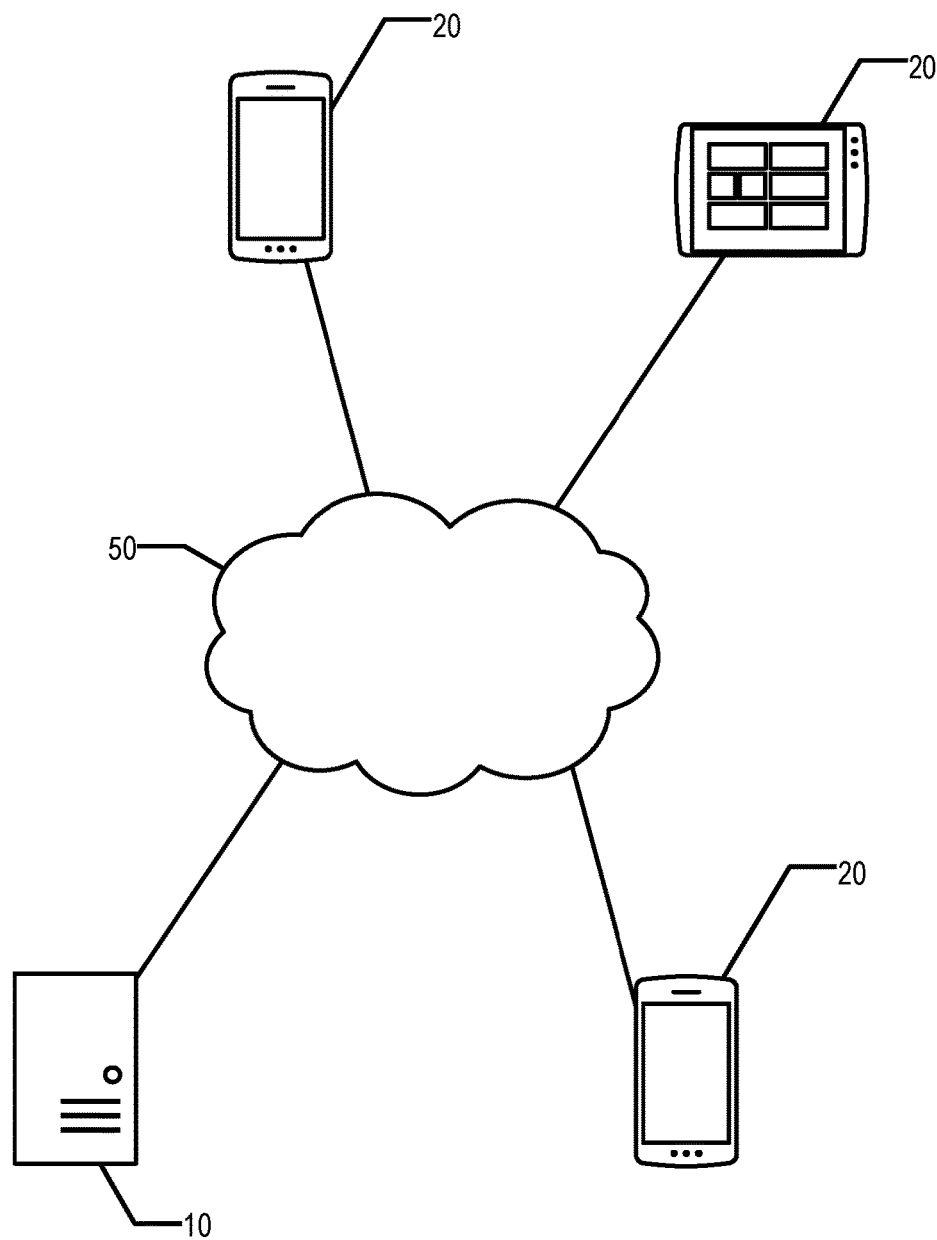
Figure 2:
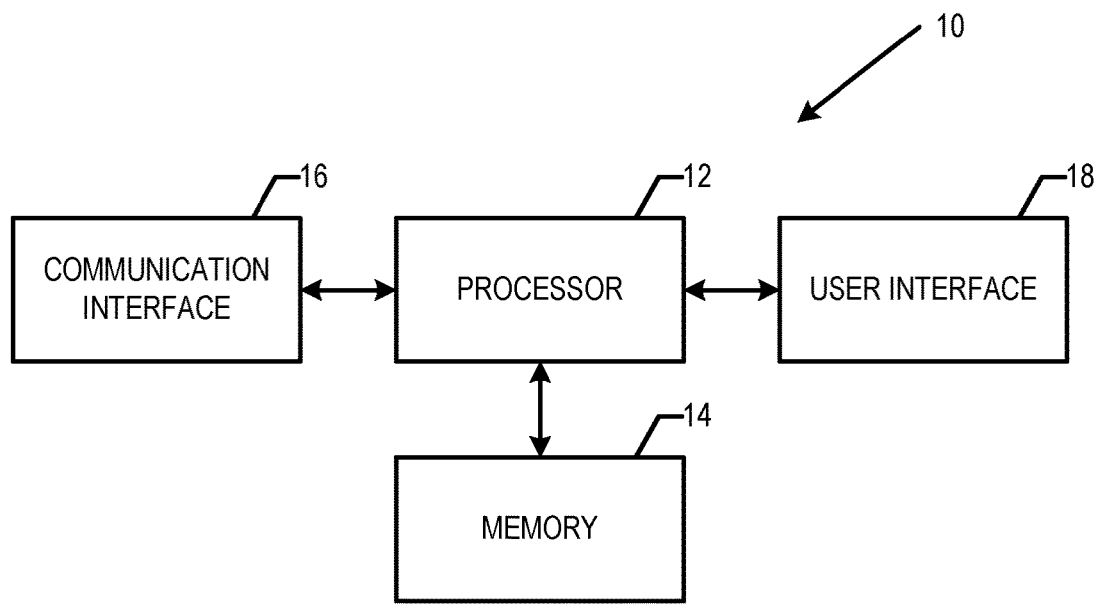
Figure 3:
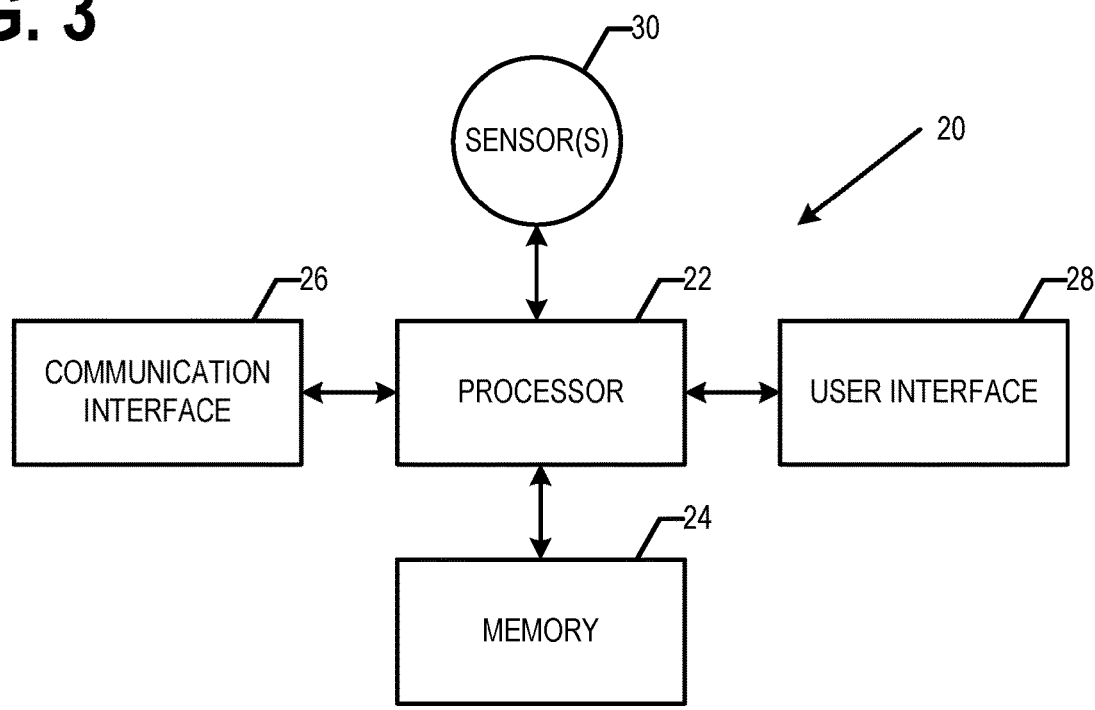
Figure 4:
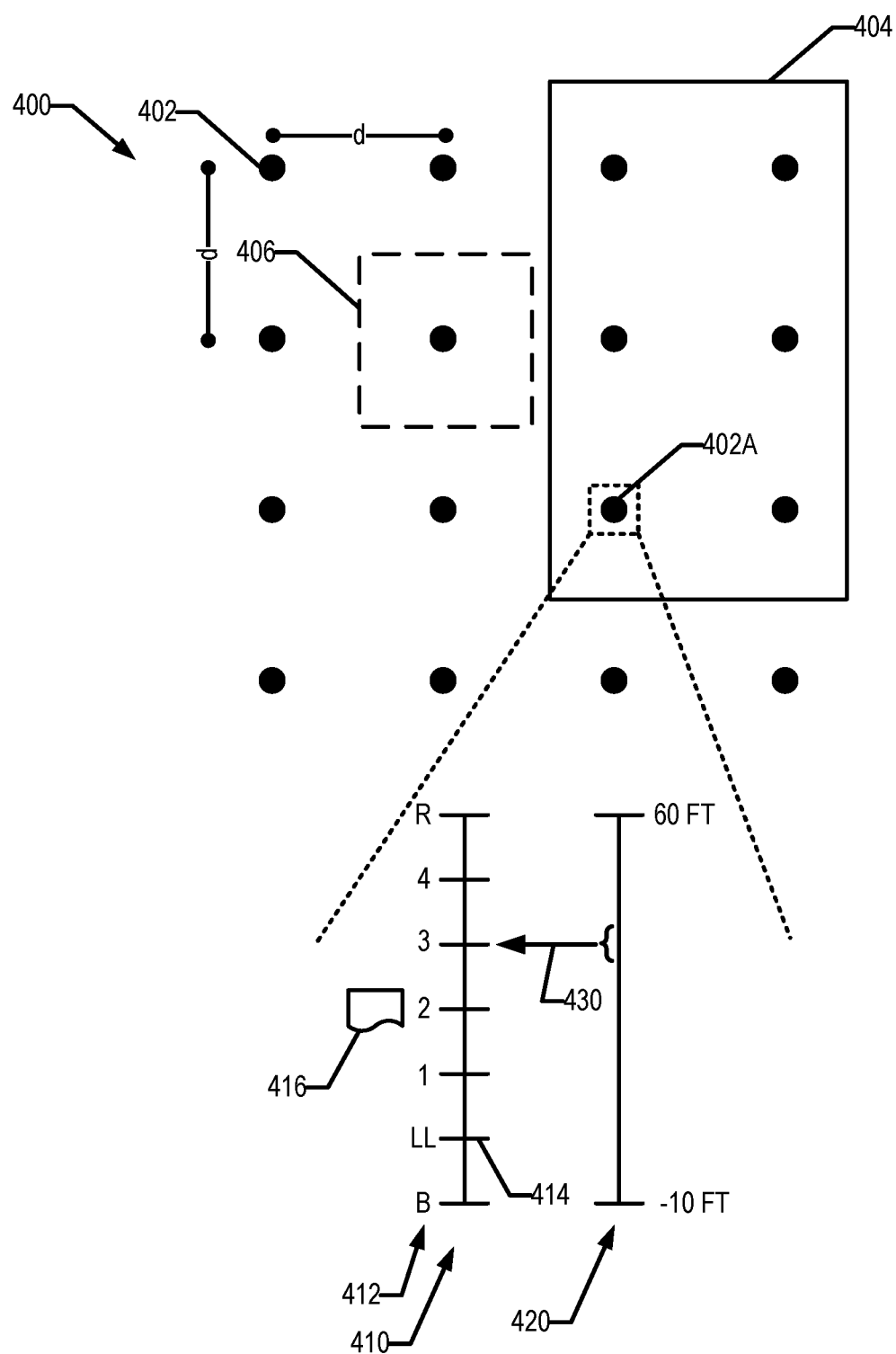
Figure 5:
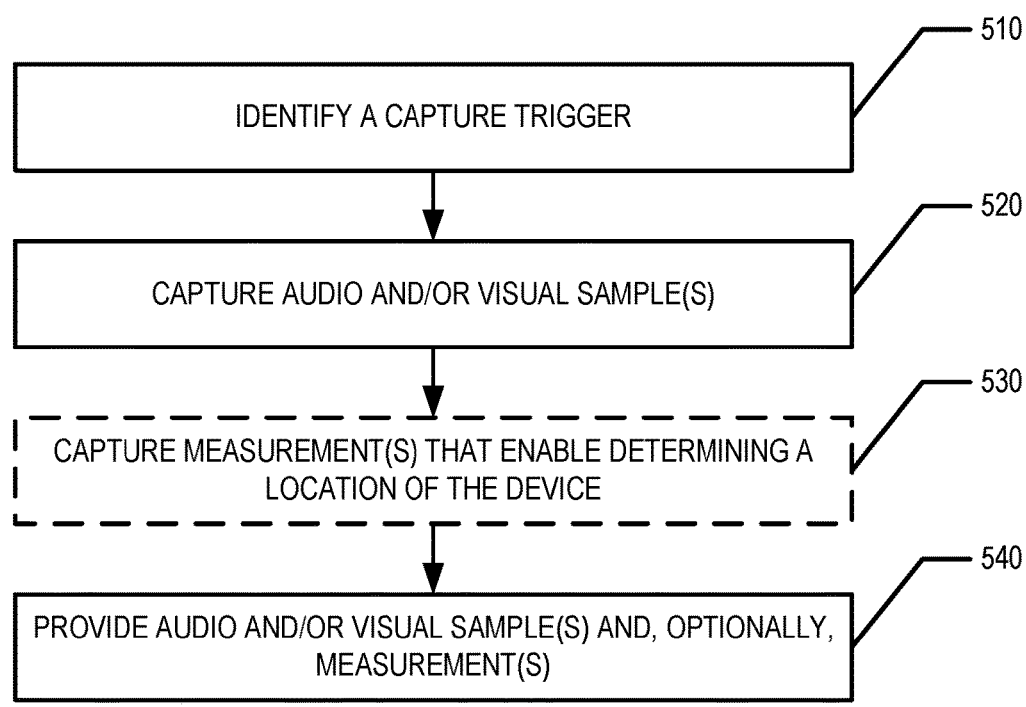
Figure 6:
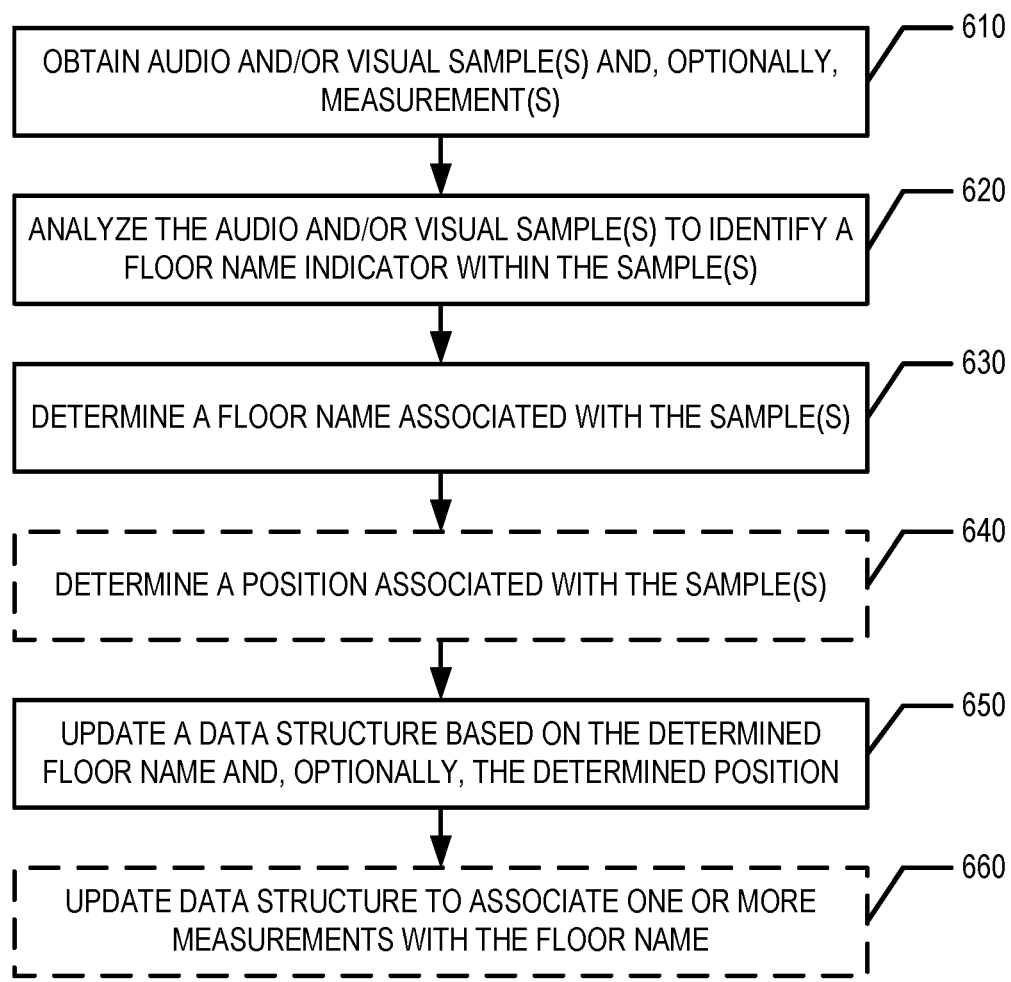
Figure 7:
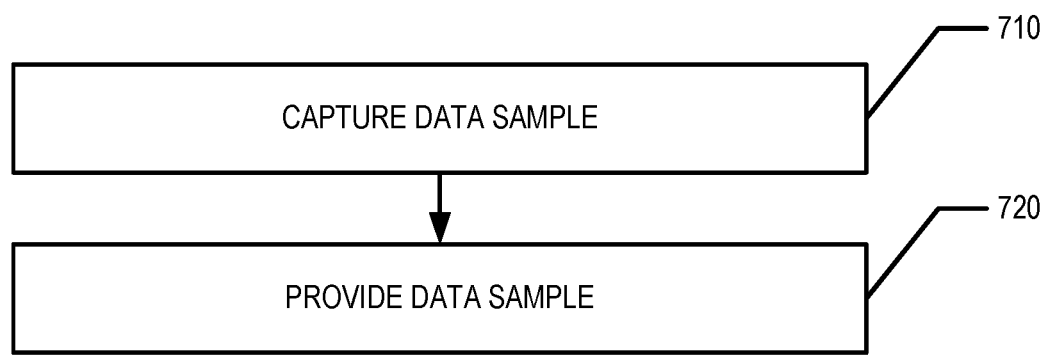
Figure 8:
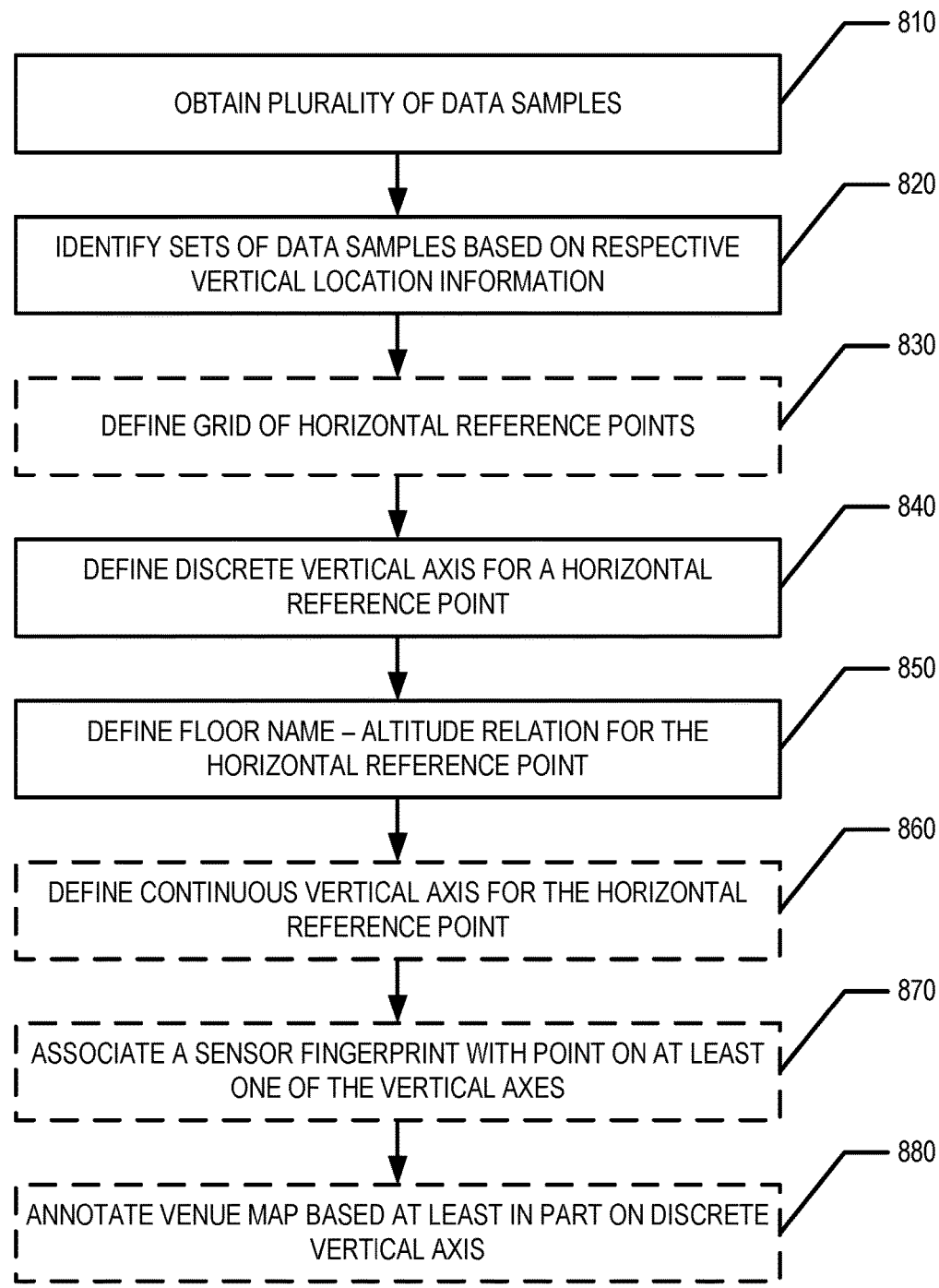
Figure 9:
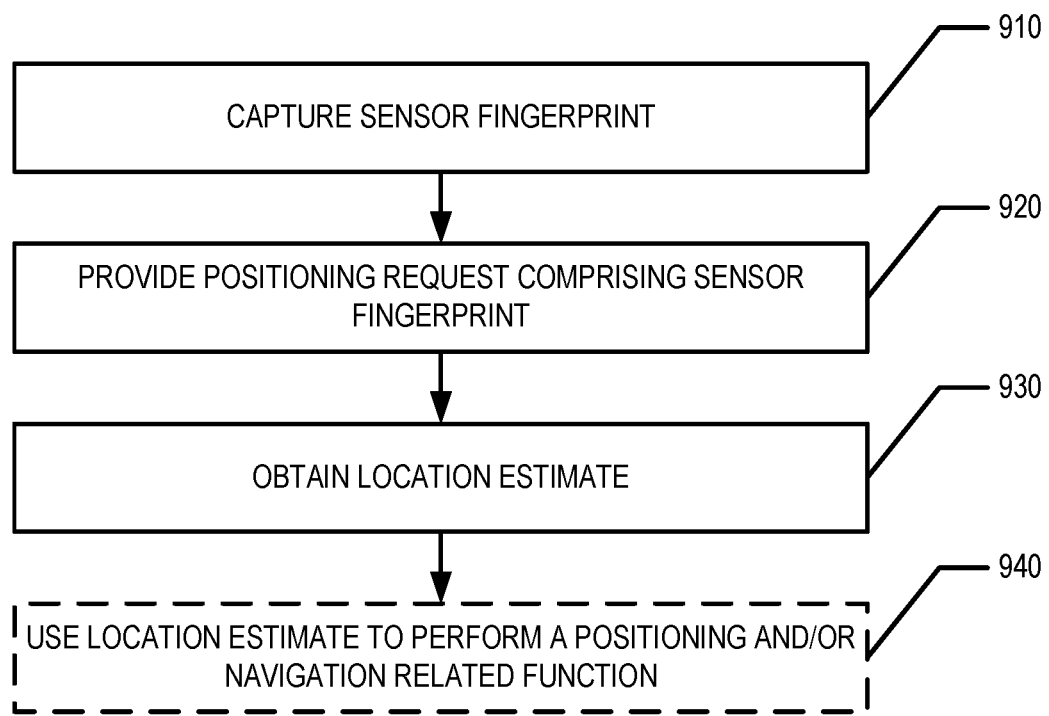
Figure 10:
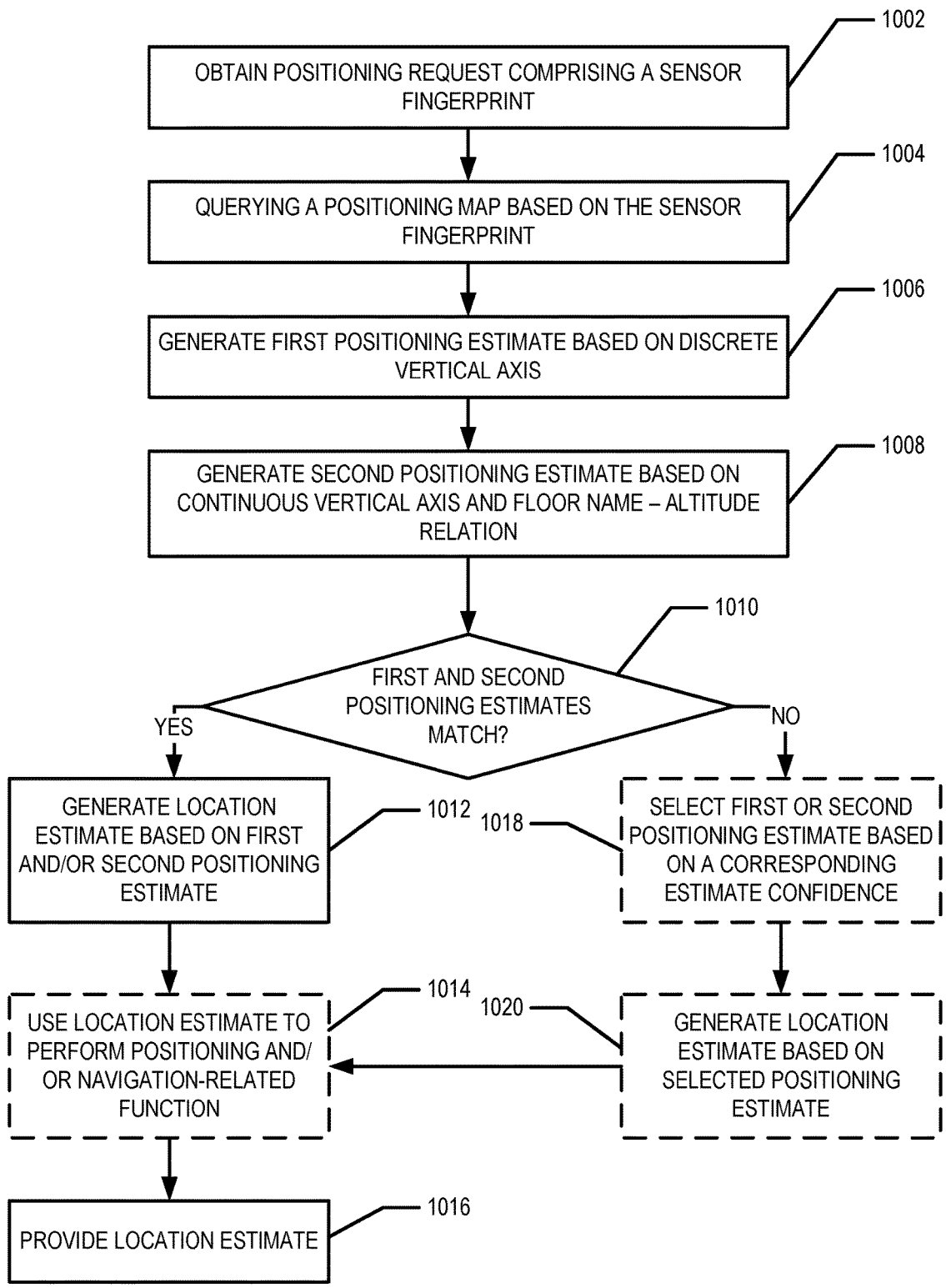

Having thus described certain example embodiments in general terms, reference will hereinafter be made to the accompanying drawings, which are not necessarily drawn to scale, and wherein:

FIG. 1 is a block diagram showing an example system of one embodiment of the present disclosure;

FIG. 2 is a block diagram of a network device that may be specifically configured in accordance with an example embodiment;

FIG. 3 is a block diagram of a device that may be specifically configured in accordance with an example embodiment;

FIG. 4 is a block diagram illustrating an example of a portion of a positioning map, in accordance with an example embodiment;

FIG. 5 is a flowchart illustrating operations performed, such as by the device of FIG. 3, in accordance with an example embodiment;

FIG. 6 is a flowchart illustrating operations performed, such as by the network device of FIG. 2, in accordance with an example embodiment;

FIG. 7 is a flowchart illustrating operations performed, such as by the device of FIG. 3, in accordance with an example embodiment;

FIG. 8 is a flowchart illustrating operations performed, such as by the network device of FIG. 2, in accordance with an example embodiment;

FIG. 9 is a flowchart illustrating operations performed, such as by the network device of FIG. 2, in accordance with an example embodiment; and FIG. 10 is a flowchart illustrating operations performed, such as by the device of FIG. 3, in accordance with an example embodiment.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. Like reference numerals refer to like elements throughout. As used herein, the terms "data," "content," "information," and similar terms may be used interchangeably to refer to data capable of being transmitted, received and/or stored in accordance with embodiments of the present invention. As used herein, the terms "substantially" and "approximately" refer to values and/or tolerances that are within manufacturing and/or engineering guidelines and/or limits. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware.

I. General Overview

Methods, apparatus and computer program products are provided in accordance with an example embodiment in order to determine, deduce, identify, and/or learn floor names for various buildings and/or venues. For example, audio and/or visual samples may be captured. For example, an audio sample may include an automated elevator voice announcing that an elevator had reached a particular floor and/or level of a building and/or venue. For example, the visual sample may comprise image data corresponding to a digital image comprising a representation of one or more visual floor and/or level indicators within an elevator. For example, the visual sample may comprise image data corresponding to a digital image of elevator buttons within an elevator possibly with one or more of the buttons illuminated. The audio and/or visual samples may be analyzed to identify a floor name indicator in the sample. The floor name for a floor and/or level of the building and/or venue may then be determined based on floor name indicator identified from the audio and/or visual sample. The determined floor name may be used to update a positioning map corresponding to a geographic area including the building and/or venue, a venue map corresponding to the building and/or venue, and/or the like. The positioning map and/or venue map may then be used to perform one or more positioning-related and/or navigation-related functions. Some non-limiting examples of positioning-related and/or navigation-related functions include localization, route determination, lane level route determination, operating a vehicle along a lane level route, route travel time determination, lane maintenance, route guidance, lane level route guidance, provision of traffic information/data, provision of lane level traffic information/data, vehicle trajectory determination and/or guidance, vehicle speed and/or handling control, route and/or maneuver visualization, provision of safety alerts, and/or the like. As used herein, a venue may be a building, campus, comprise multiple buildings, be a portion of a building, may be at least partially out of doors, and/or the like.

Methods, apparatus and computer program products are provided in accordance with an example embodiment in order to generate, create, build, and/or the like a map, such as a positioning map, that can be used to determine a three-dimensional location where the vertical component of a device's location is given by a floor name corresponding to a building and/or venue located at the horizontal plane component of the three-dimensional location. For example, the three-dimensional location may include a horizontal plane component and a vertical component. The vertical component may indicate a floor name of a building and/or venue corresponding to the three-dimensional location and the horizontal plane component may indicate a point on the Earth's surface corresponding to the three-dimensional location. For example, the horizontal plane component may be a latitude and longitude pair. In various embodiments, the map is generated, created, built, and/or the like by analyzing a plurality of data samples.

The data samples include respective vertical locations of respective devices when the devices captured the corresponding data samples. In various embodiments, a first set of the data samples provide the vertical location as a floor name for a building and/or venue floor at which the respective device was located when the one or more measurements were obtained, a second set of the data samples provide the vertical location as both an altitude and a floor name of the respective device when the one or more measurements were obtained, and a third set of the data samples provide the vertical location as an altitude of the respective device when the one or more measurements were obtained. In various embodiments, a discrete vertical axis is defined for a horizontal reference position based on analyzing data samples of the first set of data samples (which indicate the vertical location as a floor name for a building and/or venue floor at which the respective device was located when the one or more measurements were captured) corresponding to the horizontal reference position. The discrete vertical axis comprises levels labeled by corresponding floor names of the building containing the corresponding horizontal reference position. In various embodiments, a floor name—altitude relation for a horizontal reference position may be determined and/or defined based on analyzing data samples of the second set of data samples (which indicate the vertical location as both a floor name and an altitude of the respective device when the one or more measurements were captured) corresponding to the horizontal reference position. In various embodiments, a continuous axis is determined and/or defined for a horizontal reference position based on analyzing data samples of the third set of data samples (which provide the vertical component of a device's location as an altitude of the respective device when the one or more measurements were captured) that correspond to the horizontal reference position.

In various embodiments, the map (e.g., positioning map, venue map, and/or the like) may then be used to perform one or more positioning-related and/or navigation-related functions. Some non-limiting examples of positioning-related and/or navigation-related functions include localization, route determination, lane level route determination, operating a vehicle along a lane level route, route travel time determination, lane maintenance, route guidance, lane level route guidance, provision of traffic information/data, provision of lane level traffic information/data, vehicle trajectory determination and/or guidance, vehicle speed and/or handling control, route and/or maneuver visualization, provision of safety alerts, and/or the like.

Methods, apparatus and computer program products are provided in accordance with an example embodiment in order to provide a location estimate of a device where a vertical component of the location estimate is provided as a floor name for the corresponding building and/or venue. For example a positioning request may be received that includes one or more sensor measurements and/or a sensor fingerprint. In various embodiments, the one or more sensor measurements and/or sensor fingerprint may identify one or more access points observed by the device, indicate a signal strength of a signal generated by an access point and received by the device, indicating a one way or round trip time value for a signal generated by an access point and received by the device, and/or the like. For example, for one or more observed access points that are cellular network cells, the sensor fingerprint may include global and/or local identifiers configured to identify the one or more access points observed and, possibly, a signal strength and/or pathloss estimate for an observed signal generated and/or transmitted by a respective access point; timing measurements such as one way and/or round trip timing values, timing advance, and/or other timing measurements for an observed signal generated and/or transmitted by a respective access point; and/or the like. For example, for one or more observed access points that are wireless local area network (WLAN) access points, the sensor fingerprint may include basic service set identifiers (BSSIDs) and/or media access control addresses (MAC addresses) configured to identify the one or more access points observed and, possibly, a service set identifiers (SSID) configured to identify a respective access point; a signal strength measurement such as received signal strength index, a physical power (e.g., Rx) level in dBm, and/or other signal strength measurement and/or pathloss estimate for an observed signal generated and/or transmitted by a respective access point; timing measurements such as one way and/or round trip timing values, timing advance, and/or other timing measurements for an observed signal generated and/or transmitted by a respective access point; and/or the like.

A map (e.g., a positioning map) may be queried based on the one or more sensor measurements and/or sensor fingerprint to generate at least one position estimate for the device. For example, the at least one position estimate may be a first position estimate that is generated based on a discrete vertical axis corresponding to a horizontal reference position of the first position estimate. For example, the at least one position estimate may be a second position estimate that is generated based on a continuous vertical axis corresponding to the horizontal reference position of the second position estimate and a floor name—altitude relation for the horizontal reference position of the second position. In an example embodiment, a location estimate for the device is determined, generated, and/or the like based on at least one of the first or second position estimates. the location estimate may then be provided to the device and/or as input to a positioning-related and/or navigation-related function.

FIG. 1 provides an illustration of an example system that can be used in conjunction with various embodiments of the present invention. As shown in FIG. 1, the system may include one or more network devices 10, one or more devices 20, one or more networks 50, and/or the like. In various embodiments, a device 20 may be a user device, probe device, and/or the like. In various embodiments, the device 20 may be an in vehicle navigation system, vehicle control system, a mobile computing device, a mobile data gathering platform, IoT device, and/or the like. In various embodiments, the device 20 may be a smartphone, tablet, personal digital assistant (PDA), personal computer, desktop computer, laptop, mobile computing device, IoT device, and/or the like. In general, an IoT device is a mechanical and/or digital device configured to communicate with one or more computing devices and/or other IoT devices via one or more wired and/or wireless networks 50. In an example embodiment, the network device 10 is a server, group of servers, distributed computing system, and/or other computing system. For example, the network device 10 may be in communication with one or more devices 20 and/or the like via one or more wired or wireless networks 50.

In an example embodiment, a network device 10 may comprise components similar to those shown in the example network device 10 diagrammed in FIG. 2A. In an example embodiment, the network device 10 is configured to audio and/or visual samples, data samples, and/or positioning requests captured/generated and provided by one or more devices 20; identifying floor name indicators from audio and/or visual samples; determining floor names for a building and/or venue based on an identified floor name indicator; updating a map based on a determined floor name; determining and/or defining discrete vertical axes, continuous axes, and/or floor name—altitude relations for one or more horizontal reference positions based on analyzing data samples; generating positioning maps, possibly including sensor fingerprints, comprising discrete vertical axes and/or floor name—altitude relations for one or more horizontal reference positions; generating position estimates and/or location estimates based on and/or responsive to a positioning request; and providing location estimates, positioning maps, and/or venue maps. For example, as shown in FIG. 2A, the network device 10 may comprise a processor 12, memory 14, a user interface 18, a communications interface 16, and/or other components configured to perform various operations, procedures, functions or the like described herein. In various embodiments, the network device 10 stores a geographical database and/or positioning map (e.g., in memory 14). In at least some example embodiments, the memory 14 is non-transitory.

In an example embodiment, a device 20 is a mobile computing entity, IoT device, and/or the like. In an example embodiment, the device 20 may be configured to capture, generate, and/or obtain audio and/or visual samples, data samples, sensor fingerprints, and/or positioning requests; provide (e.g., transmit) the audio and/or visual samples, data samples, sensor fingerprints and/or positioning requests; receive a location estimate and/or at least a portion of a positioning map; and/or perform one or more positioning-related and/or navigation-related functions based on the location estimate. In an example embodiment, as shown in FIG. 2B, the device 20 may comprise a processor 22, memory 24, a communications interface 26, a user interface 28, one or more sensors 30 and/or other components configured to perform various operations, procedures, functions or the like described herein. In various embodiments, the device 20 stores at least a portion of one or more digital maps (e.g., geographic databases, positioning maps, and/or the like) and/or computer executable instructions for performing one or more positioning-related and/or navigation related functions in memory 24. In at least some example embodiments, the memory 24 is non-transitory.

In various embodiments, the sensors 30 comprise one or more location sensors such as a GNSS sensor, inertial measurement unit (IMU) sensors (e.g., accelerometers, gyroscopes, magnetometers, and/or the like), altimeters, and/or the like. In various embodiments, the sensors 30 comprise one or more image sensors configured to capture visual samples, such as digital camera(s), 3D cameras, 360° cameras, and/or image sensors. In various embodiments, the sensors 30 comprise one or more audio sensors configured to capture audio samples, such as a microphone and/or other audio sensor. In an example embodiment, the one or more sensors 30 comprise one or more environmental sensors such barometers, thermometers, humidity sensors, and/or the like. In various embodiments, the one or more sensors 30 may comprise one or more interfaces, such as radio interfaces, configured to observe and/or receive signals generated and/or transmitted by one or more access points. For example, the one or more interfaces may be configured (possibly in coordination with processor 22) to determine an access point identifier configured to identify the access point that generated and/or transmitted a signal observed by the device 20, a signal strength of the signal observed by the device 20, a one way or round trip time value for a signal observed by the device 20, and/or the like. As used herein, when a device 20 observes an access point, the device 20 has observed a signal generated and/or transmitted by the access point. In an example embodiment, the interface may be configured to observe one or more types of signals such as generated and/or transmitted in accordance with one or more protocols such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. For example, the interface may be configured to observe signals of one or more modern global cellular formats such as GSM, WCDMA, TD-SCDMA, LTE, LTE-A, CDMA, NB-IoT and/or non-cellular formats such as WLAN, Bluetooth, Bluetooth Low Energy (BLE), Zigbee, Lora, and/or the like. For example, the interface may be configured to observe radio, millimeter, microwave, and/or infrared wavelength signals. In an example embodiment, the interface may be coupled to and/or part of a communications interface 26. In various embodiments, the sensors 30 may comprise various other sensors such as two dimensional (2D) and/or three dimensional (3D) light detection and ranging (LiDAR)(s), long, medium, and/or short range radio detection and ranging (RADAR), ultrasonic sensors, electromagnetic sensors, (near-) infrared (IR) cameras.

Each of the components of the system may be in electronic communication with, for example, one another over the same or different wireless or wired networks 50 including, for example, a wired or wireless Personal Area Network (PAN), Local Area Network (LAN), Metropolitan Area Network (MAN), Wide Area Network (WAN), cellular network, and/or the like. In an example embodiment, a network 50 comprises the automotive cloud, digital transportation infrastructure (DTI), radio data system (RDS)/high definition (HD) radio or other digital radio system, and/or the like. For example, a device 20 may be in communication with a network device 10 via the network 50. For example, a device 20 may communicate with the network device 10 via a network, such as the Cloud. For example, the Cloud may be a computer network that provides shared computer processing resources and data to computers and other devices connected thereto. For example, the device 20 may be configured to provide one or more audio and/or visual samples, data samples, and/or positioning requests via the network 50. For example, a device 20 may be configured to receive a location estimate and/or a result of a positioning-related and/or navigation-related function performed based at least in part on the location estimate via the network 50. For example, the network device 10 may configured to receive one or more audio and/or visual samples, data samples, and/or positioning requests and provide a location estimate and/or a result of a positioning-related and/or navigation-related function performed based at least in part on the location estimate via the network 50.

Certain example embodiments of the network device 10 and/or device 20 are described in more detail below with respect to FIGS. 2A and 2B.

II. Example Operation(s)

Satellite-based (e.g., GNSS) positioning is a common device positioning tool. However, in various scenarios, such as indoors and/or in urban canyons, satellite-based positioning tends to fail and/or to be inaccurate. An example technique for determining a location of a device that does not require use of a satellite-based positioning includes comparing signals (e.g., radio signals) observed by a device to the known locations of access points that generated and/or transmitted the signals. However, such techniques require knowledge of the location of access points and coverage areas where signals generated and/or transmitted by the access points may be observed. Various embodiments described herein therefore address the technical problem of generating positioning maps that may be used to determine a position and/or location of a device based on signals observed by the device.

Moreover, when determining a position or location of device within a building and/or at a venue, it may be desired to provide the vertical component of a device's position and/or location as a floor and/or level name of a building and/or venue that the device was located on when the device generated and/or provided a positioning request. However, floor and/or level names are not consistent between various buildings and/or venues and the number of buildings and/or venues within a geographical area results in manual determination and entry of floor and/or level names for individual buildings and/or venues being untenable. Various embodiments described herein therefore address the technical problems of determining floor and/or level names for one or more buildings and/or venues and generating/updating positioning maps that include discrete vertical axes and/or floor name—altitude relations for one or more horizontal reference positions that may be used to determine a position and/or location of a device where the vertical component of the position and/or location is provided by a floor and/or level name (rather than and/or in addition to an altitude and/or the like). While the term altitude is used herein, it should be understood that the term altitude may also refer to elevation and/or height as used herein. In various embodiments, the altitude may be given as a difference in meters, for example, rom the altitude of a reference level (e.g., mean sea level) or the reference ellipsoid of the WGS84 coordinate system. Various embodiments described herein further address the technical problem of using a positioning map that includes discrete vertical axes and/or floor name—altitude relations for one or more horizontal reference positions to determine and/or provide a position and/or location that includes a vertical component given as a floor and/or level name.

FIG. 4 illustrates an example of a portion of a positioning map 400. The positioning map comprises a grid of horizontal reference positions 402. In various embodiments, the grid of horizontal reference positions 402 may be a uniform grid with each horizontal reference positions being evenly spaced from each of its nearest neighbors. For example, a grid may be defined of horizontal reference points 402 in rows and columns across a surface corresponding to the Earth's surface with each horizontal reference point 402 being a distance d from each of its closest neighbors. For example, the distance d may be one meter, two meters, five meters, ten meters, twenty meters, thirty meters, forty meters, fifty meters, sixty meters, seventy meters, one hundred meters, five hundred meters, and/or the like. In various geographic areas, the distance d may have a different value. In various embodiments, the grid of horizontal reference positions may not be uniform. For example, a horizontal reference point 402 may be associated with a building or venue. In another example, the grid of horizontal reference points 402 may be formatted based at least in part on the topology and/or geography of the corresponding geographical area.

Each horizontal reference point 402 may correspond to a geographic domain 406. For example, in the case of a uniform gird of horizontal reference points 402, the geographic domain 406 of a horizontal reference point 402 may extend to approximately halfway between the horizontal reference point and each of its nearest neighbors. For example, the geographic domains 406 of the horizontal reference points 402 may be uniform and/or consistent, in an example embodiment. In another example, the geographic domain 406 of a horizontal reference point 402 corresponds to the building footprint of a building and/or venue within which the horizontal reference point 402 is located. In an example embodiment, the geographic domain 406 of the horizontal reference positions 402 is determined based at least in part on the topology and/or geography of the geographic area where the horizontal reference positions 402 are located. In various embodiments, audio, visual, and/or data samples may be captured and floor names and/or other information/data determined by analyzing the audio, visual, and/or samples may be associated with respective horizontal reference positions 402 based on which geographic domain 406 a respective device 20 was located within when the respective audio, visual, and/or data sample was captured.

In various embodiments, the positioning map 400 further comprises one or more discrete vertical axes 410, continuous vertical axes 420, and/or floor name—altitude relations 430. Each discrete vertical axis 410, continuous vertical axis 420, and/or floor name—altitude relation 430 is associated with a horizontal reference position 402. For example, at least one of a discrete vertical axis 410, continuous vertical axis 420, and/or floor name—altitude relation 430 may be defined for each and/or at least some of the horizontal reference positions 402 of the grid. In various embodiments, the levels 414 of the discrete vertical axis are labeled by the floor names 412 of a building or venue associated with the corresponding horizontal reference position 402. In various embodiments, the continuous vertical axis is labeled by altitude. In various embodiments, the floor name—altitude relation provides a relationship, link, mapping, and/or the like between an altitude on the continuous vertical axis and a level and/or corresponding floor name of the discrete vertical axis for the same horizontal reference position 402. In various embodiments, the floor name—altitude relation may further provide a relationship, link, mapping, and/or the like between a level and/or corresponding floor name of the discrete vertical axis and an altitude and/or range of altitudes on the continuous vertical axis for the same horizontal reference position 402. In an example embodiment, one or more sensor fingerprints 416 may be associated with a level and/or corresponding floor name of the discrete vertical axis for a horizontal reference position.

As described above, determining the floor names 412 associated with various floors and/or levels of a building and/or venue corresponding to a horizontal reference position 402 may be difficult. Some example techniques for determining the floor names associated with various floors and/or levels of a building and/or venue when a map of the building and/or venue is known are described in U.S. application Ser. No. 16/904,939, filed Jun. 18, 2020; U.S. application Ser. No. 16/875,378, filed May 15, 2020; and U.S. application Ser. No. 16/782,134, filed Feb. 5, 2020, the contents of which are hereby incorporated herein by reference in their entireties. An example technique for determining the number of floor levels in an area is described in International Application No. PCT/EP2018/063936, filed May 28, 2018, the content of which is hereby incorporated herein by reference in its entirety. However, a technical problem exists as to how to determine the floor names for the various floors and/or levels of a building and/or venue. A solution for determining floor names 412 associated with various floors and/or levels of a building and/or a venue corresponding to a horizontal reference position 402 that does not require a map of the building and/or venue as a starting point will now be described in more detail.

A. Determining Floor Names

In various embodiments, floor names associated with floors and/or levels of a building and/or venue corresponding to a horizontal reference position may be determined based on analysis of audio and/or visual samples. For example, various devices 20 may capture and/or obtain audio and/or visual samples that may include a floor name indicator. A network device 10 may analyze the audio and/or visual samples to identify floor name indicators present in the audio and/or visual samples. The network device 10 may then determine a floor name for a particular floor and/or level of the corresponding building and/or venue based on the identified floor name indicators. In various embodiments, the audio and/or visual samples are audio samples of an automated elevator voice announcing the arrival of the elevator at a particular floor and/or level. In an example embodiment, the audio and/or visual sample comprises image data corresponding to a digital image of sign that includes a representation of a floor name indicator. For example, the visual sample may comprise image data corresponding to a digital image including a representation of buttons in an elevator and/or the floor indicator in an elevator (e.g., an LED and/or digital sign in the elevator indicating the current floor and/or level where the elevator is located). For example, a visual sample may comprise image data corresponding to a digital image that includes representations of one or more buttons of an elevator wherein one or more of the buttons are illuminated, indicating one or more floors and/or levels that the elevator is to visit/stop at on the particular elevator trip. In various embodiments, the audio and/or visual samples are captured in response to identifying a capture trigger. For example, a device may identify a capture trigger and automatically capture and/or obtain the audio and/or visual sample or prompt a user to capture and/or obtain the audio and/or visual sample. In an example embodiment, the capture trigger may be a change of detected barometric pressure over a particular period of time that satisfies a pressure change rate threshold criteria. For example, if a device determines that the barometric pressure is changing at greater than a pressure change rate threshold, the device may capture and/or obtain one or more audio and/or visual samples and/or prompt a user to capture and/or obtain one or more audio and/or visual samples.

Once the device captures and/or obtains the audio and/or visual sample(s), the device 20 may either analyze the audio and/or visual sample(s) to identify any floor name indicators therein, and/or provide (e.g., transmit) the audio and/or visual sample(s) and/or identified floor name indicators such that a network device 10 receives the audio and/or visual sample(s). For example, the network device 10 may analyze the audio and/or visual sample(s) to identify any floor name indicators therein. In an example embodiment, the network device 10 analyzes the audio and/or visual samples using a machine learning trained model configured to identify audio and/or visual samples. In various embodiments, the network device 10 may determine a floor name based on an identified floor name indicator and use the determined floor name indicator to generate, build, update, and/or the like a positioning map corresponding to a geographic area and/or annotate a venue map corresponding to the building and/or venue.

In various embodiments, the device 20 may provide positioning information/data along with the audio and/or visual sample(s) that indicates the position and/or location of the device 20 when the audio and/or visual sample(s) were captured and/or obtained. In various embodiments, the positioning information/data may be a latitude and longitude or other two dimensional location of the device 20; a latitude, longitude, and altitude of the device 20 or other three dimensional location of the device 20; a sensor fingerprint identifying one or more access points observed by the device 20 at the location at which the audio and/or visual sample(s) were captured and/or obtained; and/or the like. In particular, the positioning information/data may enable the network device 10 to determine at least a two dimensional location of the device 20 when the audio and/or visual sample(s) were captured and/or obtained (e.g., using a positioning map and/or the like). For example, based on the positioning information/data, the network device 10 may determine a horizontal reference position corresponding to the audio and/or visual sample(s). For example, the horizontal reference position corresponding to the audio and/or visual sample(s) may be the horizontal reference position 402 associated with the geographic domain 406 within which the respective device 20 was located when the audio and/or visual sample(s) was captured. In various embodiments, the positioning information/data may also enable the network device 10 to determine the elevation and/or height of the device 20 when the audio and/or visual sample(s) were captured and/or obtained.

FIG. 5 provides a flowchart illustrating various processes, procedures, operations, and/or the like, performed, for example, by a device 20, according to various embodiments. Starting at block 510, a capture trigger may be identified. For example, a device 20 may identify a capture trigger. For example, a device 20 may comprise means, such as processor 22, memory 24, one or more sensors 30, and/or the like, configured to identify a capture trigger.

In various embodiments, the capture trigger is identified when measurements from at least one of the one or more sensors 30 has a rate of change over a particular period of time that satisfies a corresponding rate of change threshold criteria. For example, when measurements from at least one of the one or more sensors 30 indicates a rate of change over a particular period of time is greater than a corresponding change rate threshold, a capture trigger may be identified. In various embodiments, the change rate threshold may correspond to a rate of change in altitude and the at least one sensor may be an altimeter. In another example, the change rate threshold may correspond to a rate of change in vertical acceleration and the at least one sensor may be part of an IMU (e.g., one or more accelerometers). In another example, the change rate threshold may correspond to a rate of change in barometric pressure and the at least one sensor may be a barometer. In various embodiments, various combinations of rates of change (e.g., altitude change, vertical acceleration change, pressure change) may be used to determine if the rate of change threshold criteria is satisfied. In particular, the rate of change threshold criteria are configured to determine when it is likely that the device 20 is moving between a first floor at a first altitude and a second floor at a second altitude that is different from the first altitude, but within the same building and/or venue.

In an example embodiment, the capture trigger is identified by analyzing measurements captured by the one or more sensors 30 using a machine learning trained floor change model. For example, the floor change model may be a classifier such as a neural network, Bayesian classifier, and/or the like. In an example embodiment, the floor change network is determined to classify measurements captured by sensors as indicating that a device is changing floors and/or levels of a building and/or venue or as indicating that the device is not changing floors and/or levels of a building and/or venue. In an example embodiment, the floor change network is trained using a supervised classification machine learning technique using measurements captured as one or more devices moved through retail stores, retail chain stores, hotels, hotel chains, public transport buildings and/or stations, and/or the like. For example, the floor change model may be configured to analyze one or more of altimeter measurements, barometer measurements, IMU sensor measurements, and/or other measurements that may be captured by one or more sensors 30 to classify a movement of a device as being on a same floor and/or level or as changing floors and/or levels. When the floor change model classifies a movement of the device 20 as changing floors and/or levels, a capture trigger may be identified.

At block 520, an audio and/or visual sample is captured. For example, the device 20 may capture an audio and/or visual sample. For example, the device 20 may comprise means, such as processor 22, memory 24, user interface 28, one or more sensors 30, and/or the like, configured for capturing one or more audio and/or visual samples. For example, after and/or responsive to identifying a capture trigger, the device 20 may use one or more sensors 30, such as a microphone, digital camera, and/or the like, to automatically capture one or more audio and/or visual samples. For example, after and/or responsive to identifying a capture trigger, the device 20 may prompt a user, via a prompt provided via the user interface 28, to hold the device 20 a particular manner (e.g., with any elevator buttons and/or elevator floor indicator within the field of the digital camera) and either automatically capture the visual and/or audio sample and/or capture the visual and/or audio sample responsive to use interaction with one or more elements of the user interface 28. For example, a user may be prompted (e.g., via one or more prompts provided the user interface 28) to hold the device so that elevator buttons and/or an elevator floor indicator is within the field of view of a digital camera of the device 20 and then prompt the user to select and/or interact with an element of the user interface 28 to cause an audio and/or visual sample to be captured. In an example embodiment, the device 20 may capture both an audio sample and a visual sample and/or an audio/visual sample (e.g., a video including an audio track which may then be separated into an audio sample and a visual sample) such that it may be determined if the floor indicators identified in the audio sample and the visual sample are in agreement (e.g., indicate the same floor name).

At block 530, in various embodiments, one or more measurements, possibly including and/or aggregated into a sensor fingerprint, may be captured at approximately the same time that the audio and/or visual sample is captured. For example, the device 20 may capture one or more measurements at approximately the same time that the audio and/or visual sample is captured. For example, the device 20 may comprise means, such as processor 22, memory 24, one or more sensors 30, and/or the like for capturing one or more measurements in real time and/or near real time with respect to the capturing of the audio and/or visual sample. For example, the one or more measurements may be captured while the device is in approximately the same position and/or location as when the audio and/or visual sample was captured. For example, the one or more measurements may enable determining a two-dimensional and/or three-dimensional position and/or location of the device 20 when the audio and/or visual sample was captured. For example, a location sensor of the one or more sensors 30 (e.g., GNSS sensor, IMU sensors, altimeter, and/or the like) may capture one or more measurements configured for determining the two-dimensional position and/or location (e.g., the horizontal plane component) of the device 20 when the audio and/or visual sample was captured and/or the three-dimensional position and/or location (e.g., the horizontal plane component and a vertical component) of the device 20 when the audio and/or visual sample was captured. For example, an interface (e.g., radio interface) of the one or more sensors 30 may capture a one or more measurements which may be aggregated into a sensor fingerprint identifying one or more access points observed by the device 20, indicating a signal strength of a signal generated by an access point and received by the device 20, indicating a one way or round trip time value for a signal generated by an access point and received by the device 20, and/or the like. The sensor fingerprint may be used in coordination with an existing positioning map (e.g., a two-dimensional positioning map, an altitude-based three-dimensional positioning map, a floor name-based three-dimensional positioning map that is being developed and/or built, and/or other positioning map) to determine a position and/or location of the device 20 when the audio and/or visual sample was captured. For example, one or more measurements comprising image data corresponding to the device's 20 surroundings may be captured for use in identifying a position and/or location of the device 20 via visual odometry.

At block 540, the audio and/or visual sample(s) and, optionally, the one or more measurements are provided. For example, the device 20 may provide the audio and/or visual sample(s) and, optionally, the one or more measurements that enable determining the two-dimensional and/or three-dimensional position and/or location of the device 20 when the audio and/or visual sample(s) was/were captured. For example, the device 20 may comprise means, such as processor 22, memory 24, communications interface 26, and/or the like, for providing the audio and/or visual sample(s) and, optionally, the one or more measurements that enable determining the two-dimensional and/or three-dimensional position and/or location of the device 20 when the audio and/or visual sample(s) was/were captured. In various embodiments, the audio and/or visual sample(s) and, optionally, the one or more measurements are provided (e.g., transmitted) via the one or more wired and/or wireless networks 50. For example, the audio and/or visual sample(s) and, optionally, the one or more measurements may be provided such that a network device 10 receives the audio and/or visual sample(s) and, optionally, the one or more measurements.

FIG. 6 provides a flowchart illustrating processes, procedures, operations, and/or the like, performed by a network device 10, in an example embodiment, to update, build, generate, and/or the like a positioning map, venue map, and/or the like where building and/or venue floors and/or levels are annotated with the appropriate floor name for the building and/or venue. Starting at block 610, an audio and/or visual sample and, optionally, one or more measurements that enable determining a position and/or location of the device 20 when the audio and/or visual sample was captured are obtained. For example, the network device 10 may obtain and/or receive the audio and/or visual sample and, optionally, one or more measurements. For example, the network device 10 may comprise means, such as processor 12, memory 14, communications interface 16, and/or the like, for obtaining and/or receiving the audio and/or visual sample and, optionally, one or more measurements. For example, the network device 10 may receive the audio and/or visual sample and, optionally, one or more measurements via the one or more wired and/or wireless networks 50.

At block 620, the audio and/or visual sample may be analyzed to identify any floor name indicators therein. For example, the network device 10 may analyze the audio and/or visual sample to identify any floor name indicators therein. For example, the network device 10 may comprise means, such as processor 12, memory 14, and/or the like, for analyzing the audio and/or visual sample to identify any floor name indicators therein. In an example embodiment, the audio and/or visual sample is analyzed using an indicator identification model. In an example embodiment, the indicator identification model is a machine learning trained model. For example, the indicator identification model may be configured and/or trained to identify floor name indicators based on expected floor name indicator formats. For example, the indicator identification model may be configured to analyze an audio sample using a speech to text component of the model to determine, generate, and/or extract the text content of the audio sample. For example, the indicator identification model may be configured to analyze a visual sample using an optical character recognition (OCR) component, for example to determine, generate, and/or extract the text content and possibly the formatting of the text content of the visual sample. As used herein, the formatting of the text content includes the font size of elements of the text content, font style (e.g., bold, italicized, underlined, strike through, double underlined, and/or the like), the physical layout and/or spacing between different text content elements, and/or the like. The text content and/or formatting of the text content of the audio and/or visual sample may then be analyzed using a natural language processing model and/or format identification algorithm to identify a floor name indicator based on a format of the text content of the audio and/or visual sample. For example, if the text content includes the words floor or level (in the local language) followed and/or proceeded by a number, the word floor or level (in the local language) and the following and/or preceding number may be extracted and/or identified as a floor name indicator. In another example, if the text content includes a letter or abbreviation commonly associated with a floor or level in the local language (e.g., F, L, B, P, Flr, Lvl, etc.) followed and/or proceeded by a number, the letter or abbreviation and the following and/or preceding number may be extracted and/or identified as a floor name indicator. In an example embodiment, if the text content and format indicates a plurality of numbers, letter—number combinations, abbreviation—number combinations, and/or the like enclosed within circles, squares, and/or other shape, possibly with at least one of the shapes illuminated, the number, letter—number combination, abbreviation—number combination and/or the like enclosed within the shapes and/or enclosed within the illuminated shape may be extracted and/or identified as a floor name indicator. Thus, the indicator identification model may be configured and/or trained to extract and/or identify floor name indicators from the audio and/or visual sample via an analysis of the audio and/or visual sample. In an example embodiment, the indicator identification model is configured to extract and/or identify floor name indicators form the audio and/or visual sample based on local conventions and/or patterns of local conventions of floor and/or level naming and/or display thereof. As used herein, the local conventions may correspond to a geographic locality (e.g., city, county, state, province, country, and/or the like) and/or a brand associated with the building and/or venue. For example, it may be expected that all hotels of a particular brand name may have similar floor naming schemes and/or formats.

At block 630, a floor name is determined based at least in part on the floor name indicator extracted and/or identified from the audio and/or visual sample. For example, the network device 10 may determine a floor name based at least in part on the floor name indicator extracted and/or identified from the audio and/or visual sample. For example, the network device 10 may comprise means, such as processor 12, memory 14, and/or the like, for determining a floor name based at least in part on the floor name indicator extracted and/or identified from the audio and/or visual sample. For example, a floor name may be determined to be "B1" when the floor name indicator extracted and/or identified from the audio and/or visual sample is "B1." In another example, the floor name may be determined to be "Floor 2" when the floor name indicator extracted and/or identified from the audio and/or visual sample is "Flr 2."

At block 640, a two-dimensional and/or three-dimensional position associated with the determined floor name may be determined. For example, the device 20 may have captured one or more measurements for enabling determining the position and/or location of the device 20 when the audio and/or visual sample was captured and provided (e.g., transmitted via the one or more wired and/or wireless networks 50) the one or more measurements and/or a position and/or location determined based on the one or more measurements in association with the audio and/or visual sample. As such, the network device 10 may receive the one or more measurements and/or a position and/or location determined based on the one or more measurements in association with the audio and/or visual sample (e.g., via the one or more wired and/or wireless networks 50). The network device 10 may analyze the one or more measurements to determine a two-dimensional and/or three dimensional position and/or location of the device 20 when the audio and/or visual sample was captured. For example, if the one or more measurements comprise one or more measurements captured by location sensors (e.g., GNSS sensor, IMU sensors, altimeter, and/or the like), the one or more measurements may provide the two-dimensional and/or three-dimensional position and/or location of the device 20 when the audio and/or visual sample was captured. For example, if the one or more measurements comprise one or more measurements captured by location sensors (e.g., GNSS sensor, IMU sensors, altimeter, and/or the like), the one or more measurements may provide a horizontal plane component of the device's position and/or location and/or an altitude of the device 20 when the audio and/or visual sample was captured. For example, if the one or more measurements comprise access point observations aggregated into a sensor fingerprint, the sensor fingerprint may be used to query an existing and/or in process positioning map (e.g., a two-dimensional positioning map, an altitude-based three-dimensional positioning map, a floor name-based three-dimensional positioning map that is being developed and/or built, and/or other positioning map) to determine a two-dimensional and/or three-dimensional position and/or location (e.g., horizontal plane component and possibly an altitude) of the device 20 when the audio and/or visual sample was captured. For example, if the one or more measurements comprise image data corresponding to digital images and/or the like corresponding to the surroundings of the device 20, the image data may be analyzed to identify features therein which may then be used to determine a two dimensional and/or three dimensional position and/or location of the device 20 when the audio and/or visual sample was captured using visual odometry techniques, feature maps, and/or the like. Once the two-dimensional and/or three-dimensional position and/or location of the device 20 when the audio and/or visual sample was captured is determined based on the one or measurements and/or a position and/or location determined based on the one or more measurements provided by the device 20 in association with the audio and/or visual sample, the network device 10 may associate the floor name with the determined position and/or location of the device 20 when the audio and/or visual sample was captured. For example, the floor name determined based on analysis of the audio and/or visual sample may be associated with a two-dimensional and/or three-dimensional (e.g., horizontal plane component and possibly altitude) position and/or location of the device 20 when the audio and/or visual sample was captured.

In an example embodiment, a grid of horizontal reference positions 402 are defined. In such an embodiment, once the two-dimensional and/or three-dimensional position and/or location of the device 20 when the audio and/or visual sample was captured, the audio and/or visual sample may be associated with a horizontal reference position based on the two-dimensional and/or three-dimensional position and/or location. For example, it may be determined (e.g., by the network device 10) which geographic domain 406 that the horizontal plane component of the two-dimensional and/or three-dimensional location of the device 20 when the audio and/or visual sample was captured is located within. The audio and/or visual sample may then be associated with the horizontal reference position 402 associated with and/or configured to represent the geographic domain 406.

At block 650, a data structure is updated based at least in part on the determined floor name and, possibly, on the associated position and/or location. For example, the network device 10 may update a data structure based at least in part on the determined floor name and, possibly, on the associated position and/or location (e.g., the position and/or location of the device 20 when the audio and/or visual sample was captured). For example, the network device 10 may comprise means, such as processor 12, memory 14, and/or the like, for updating a data structure based at least in part on the determined floor name and, possibly, the associated position and/or location. For example, the data structure may be a venue map corresponding to a building and/or venue having footprint that includes the horizontal reference position corresponding to the position and/or location of the device 20 when the audio and/or visual samples were captured. In an example embodiment, the data structure may be a positioning map. For example, the data structure may be a positioning map 400 comprising a grid of horizontal reference positions 402 with at least one horizontal reference position associated with a discrete vertical axis 410 having levels 414 corresponding to floors and/or levels of a building and/or venue having a footprint that encompasses the horizontal reference position. For example, the determined floor name may be applied as a label 412 of a level of a discrete vertical axis 410 associated with the horizontal reference position corresponding to the position and/or location of the device 40 when the audio and/or visual sample was captured. For example, the floor name may be assigned to a floor and/or level of the venue map and/or level of a discrete vertical axis of a positioning map based on the altitude of the position and/or location of the device 20 when the audio and/or visual samples were captured and possibly based on an altitude associated with one or more floor and/or levels of the building and/or venue and/or levels of the discrete vertical axis 410. In an example embodiment, the floor name may be assigned to one or more floors and/or levels of the venue map and/or level of a discrete vertical axis of a positioning map (possibly in a provisional manner) based on the semantic meaning of the floor name (e.g., a floor and/or level with the floor name "B1" in English speaking localities may be expected to be a basement and/or at least partially below ground floor and/or level), other floor names already assigned to floors and/or levels of the venue map (e.g., it may be expected that Flr 5 is the floor immediately above Flr 4 and/or immediately below Flr 6).

At block 660, a data structure (e.g., the positioning map and/or venue map) may be updated to associate a sensor fingerprint with the position and/or location of the device 20 when the audio and/or visual sample was captured and/or the floor/level of the venue map and/or discrete vertical axis of the positioning map. For example, at least some of the one or more measurements captured by the device 20 that enable determining a position and/or location of the device 20 when the audio and/or visual samples were captured may be aggregated into a sensor fingerprint. In an example embodiment, a sensor fingerprint comprises one or more identifiers each configured to identify a respective access point observed by the device 20 at the position and/or location of the device when the audio and/or visual sample was captured and/or one or more characteristics of a signal observed by the device 20 and generated and/or transmitted by the respective access point. For example, a sensor fingerprint may identify one or more access points observed by the device, indicate a signal strength of a signal generated by an access point and received by the device, indicating a one way or round trip time value for a signal generated by an access point and received by the device, and/or the like. For example, the network device 10 may update the data structure to associate the sensor fingerprint with the horizontal reference position corresponding to the device 20 when the audio and/or visual sample was captured. For example, the network device 10 may generate and/or update one or more access point models based on the sensor fingerprint and associate and/or link the access point model to the horizontal reference position corresponding to the device 20 when the audio and/or visual sample was captured. In an example embodiment, the sensor fingerprint and/or one or more corresponding access point models may be associated with the same floor(s) and/or level(s) of the venue map and/or the same level(s) of discrete vertical axis of the positioning map as the determined floor name. For example, the sensor fingerprint and/or one or more corresponding access point models may be associated with a floor and/or level of the venue map and/or level of the discrete vertical axis of the positioning map to enable use of the venue map and/or positioning map to determine the location of other devices 20 based on sensor fingerprints observed, captured, determined, and/or aggregated thereby. In various embodiments, an access point model comprises a two-dimensional and/or three-dimensional position and/or location of the corresponding access point (e.g., a horizontal plane component and possibly an altitude or floor name as the vertical component), and a description and/or representation of the expected coverage area of the access point. For example, the access point model may describe the coverage area within which signals generated and/or transmitted by the access point are expected to be observable. An example access point model comprises a signal strength image representing the expected signal strength field of signals generated and/or transmitted by the access point.

In some embodiments, the device 20 may analyze the audio and/or visual sample(s) to identify any floor name indicators therein, determine floor names based on the identified floor name indicators, and/or analyze the one or more measurements to determine a position and/or location of the device 20 when the audio and/or visual sample(s) were captured. In such embodiments, the device 20 may perform various operations, processes, procedures, and/or the like illustrated in FIG. 6 and described herein as being performed by the network device 10. The device 20 may then provide (e.g., transmit via one or more networks 50) results of analyzing the audio and/or visual sample(s) to identify a floor name indicator therein, results of determining a floor name based on the identified floor name indicator, and/or results of analyzing the one or more measurements to determine a position and/or location of the device 20 when the audio and/or visual sample(s) were captured such that a network device 10 may receive the result(s). For example, in an example embodiment, a device 20 may perform the processes, procedures, operations, and/or the like of blocks 510, 520, and optionally 530, then perform the processes, procedures, operations, and/or the like of blocks 620, 630, and optionally 640, and then perform the processes, procedures, operations, and/or the like of block 540 with the payload providing the result(s) of analyzing the audio and/or visual sample(s) to identify a floor name indicator therein, results of determining a floor name based on the identified floor name indicator, and/or results of analyzing the one or more measurements to determine a position and/or location of the device 20 when the audio and/or visual sample(s) were captured, rather than and/or in addition to the audio and/or visual sample(s) and, optionally, the one or more measurements themselves. The network device 10 may then perform processes, procedures, operations, and/or the like similar to blocks 610, 650, and optionally 660.

B. Generating a Floor Name-Based Positioning Map

In various embodiments, a positioning map is generated, built, created, updated, and/or the like that enables positioning of a device 20 wherein the vertical component of the device's location is provided as a floor name of the corresponding building and/or venue within which the device 20 is located. In various embodiments, one or more devices 20 capture and provide data samples such that the network device 10 receives and/or obtains a plurality of data samples. In an example embodiment, each data sample respectively comprises one or more measurements associated with and/or captured/obtained by one or more sensors 30 of the respective device 20. In an example embodiment, each data sample respectively comprises a vertical component of a location of the device 20 when the one or more measurements were captured and/or obtained. The vertical component may be provided as an altitude of the respective device 20 when the one or more measurements where captured and/or obtained. For example, an altimeter associated with, co-located with, and/or that is a component of the device 20 may determine an altitude of the device 20 when the one or more measurements were captured and/or obtained. The vertical component may be provided a floor name for a building and/or venue floor and/or level at which the respective device 20 was located when the one or more measurements were captured and/or obtained. The vertical component may be provided as both an altitude and a floor name for a building and/or venue floor and/or level at which the respective device 20 was located when the one or more measurements were captured and/or obtained.

One or more sets of data samples may be generated, created, identified, and/or the like. For example, a first set of data samples may be generated, created, identified and/or the like that comprises one or more data samples of the plurality of data samples that each include the floor name for the building and/or venue floor and/or level at which the respective device was located on when the one or more measurements of the data sample were captured and/or obtained. For example, a second set of data samples may be generated, created, identified, and/or the like that comprises one or more data samples of the plurality of data samples that each include both (a) the altitude of the respective device when the one or more measurements of the data sample were captured and/or obtained and (b) the floor name for the building and/or venue floor and/or level at which the respective device was located on when the one or more measurements of the data sample were captured and/or obtained.

In various embodiments, a discrete vertical axis associated with at least one horizontal reference position with levels of the discrete vertical axis labeled by corresponding floor names of the building and/or venue containing the at least one horizontal reference position may be determined and/or defined based on analyzing the first set of data samples and/or the second set of data samples. In various embodiments, a floor name—altitude relation associated with at least one horizontal reference position may be determined and/or defined based on analyzing at least the second set of data samples. In various embodiments, a continuous vertical axis labeled by altitude may be determined and/or defined for at least one horizontal reference position based on analyzing the second set of data samples and/or the third set of data samples. The discrete vertical axis, floor name—altitude relation, and/or continuous vertical axis determined and/or defined for at least one horizontal reference position may be part of a positioning map and/or venue map. The positioning map and/or venue map may then be used to enable positioning of devices wherein a vertical component of a determined location of a device is provided by at least the floor name of a building and/or venue within which the device is located. In various embodiments, sensor fingerprints and/or access point models generated, determined, and/or the like based on sensor fingerprints may be associated with one or more levels of a discrete vertical axis and/or one more points of a continuous vertical axis.

FIG. 7 provides a flowchart illustrating various operations, processes, procedures, and/or the like that may be performed by one or more devices 20 to provide data samples such that the network device 10 may obtain a plurality of data samples. Starting at block 710, a data sample is captured and/or obtained. For example, a device 20 may capture and/or obtain a data sample. For example, the device 20 may comprise means, such as processor 22, memory 24, sensors 30, and/or the like, for capturing and/or obtaining a data sample.

In an example embodiment, the data sample comprises one or more measurements. In an example embodiment, the one or more measurements may include information/data regarding one or more observed access points. In an example embodiment, the one or more measurements comprise information/data regarding one or more observed access points that has been aggregated into a sensor fingerprint. In various embodiments, the one or more sensor measurements and/or sensor fingerprint may identify one or more access points observed by the device, indicate a signal strength of a signal generated by an access point and received by the device, indicating a one way or round trip time value for a signal generated by an access point and received by the device, and/or the like. For example, for one or more observed access points that are cellular network cells, the sensor fingerprint may include global and/or local identifiers configured to identify the one or more access points observed and, possibly, a signal strength and/or pathloss estimate for an observed signal generated and/or transmitted by a respective access point; timing measurements such as one way and/or round trip timing values, timing advance, and/or other timing measurements for an observed signal generated and/or transmitted by a respective access point; and/or the like. For example, for one or more observed access points that are WLAN access points, the sensor fingerprint may include BSSIDs and/or MAC addresses configured to identify the one or more access points observed and, possibly, a SSID configured to identify a respective access point; a signal strength measurement such as received signal strength index, an Rx level in dBm, and/or other signal strength measurement and/or pathloss estimate for an observed signal generated and/or transmitted by a respective access point; timing measurements such as one way and/or round trip timing values, timing advance, and/or other timing measurements for an observed signal generated and/or transmitted by a respective access point; and/or the like. In an example embodiment, the one or more measurements may comprise image data corresponding to the surroundings of the device 20 and/or feature information/data for one or more features extracted from and/or identified in the image data that may be used for positioning via visual odometry.

In various embodiments, the data sample comprises a vertical component of the location of the device 20 when the one or more measurements were captured and/or obtained. In an example embodiment, the data sample further comprises a horizontal plane component of a location of the device 20 when the one or more measurements were captured and/or obtained. In an example embodiment, the data sample further comprises information/data that may be used to determine the horizontal plane component of the device 20 when the one or more measurements were captured and/or obtained or to determine a horizontal reference position corresponding to the horizontal plane component of a location of the device 20 when the one or more measurements were captured and/or obtained. In various embodiments, the vertical component of the device 20 may include an altitude of the device 20 when the one or more measurements were captured and/or obtained and/or a floor name for a building and/or venue floor and/or level that the device 20 was located on when the one or more measurements were captured and/or obtained. For example, the device 20 may determine a floor name for a building and/or venue floor and/or level that the device 20 was located on when the one or more measurements were captured and/or obtained based on an audio and/or visual sample captured when the device 20 was on the building and/or venue floor and/or level where the one or more measurements captured, as described elsewhere herein. In an example embodiment, the device 20 may determine that an audio and/or visual sample was captured by the device 20 on the same building and/or venue floor and/or level when a rate of change threshold criteria is not satisfied between the capturing of the audio and/or visual sample and the capturing and/or obtaining of the one or more measurements. In an example embodiment, the device 20 may determine that an audio and/or visual sample was captured by the device 20 on the same building and/or venue floor and/or level when a floor change model has not detected a floor change between the capturing of the audio and/or visual sample and the capturing and/or obtaining of the one or more measurements. In various embodiments, the device 20 may determine a floor name for the building and/or venue floor and/or level that the device 20 was located on when the one or more measurements were captured and/or obtained using a technique similar to one of those described in U.S. application Ser. No. 16/904,939, filed Jun. 18, 2020; U.S. application Ser. No. 16/875,378, filed May 15, 2020; U.S. application Ser. No. 16/782,134, filed Feb. 5, 2020; and/or International Application No. PCT/EP2018/063936, filed May 28, 2018.

For example, a location sensor of the one or more sensors 30 (e.g., GNSS sensor, IMU sensors, altimeter, and/or the like) may capture one or more measurements configured for determining the horizontal plane component and/or vertical component of the location of the device 20 when the one or more measurements were captured and/or obtained. For example, an interface (e.g., radio interface) of the one or more sensors 30 may observe one or more access points and information/data regarding the observations of the one or more observed access points may be aggregated into a sensor fingerprint identifying one or more access points observed by the device 20, indicating a signal strength of a signal generated by an access point and received by the device 20, indicating a one way or round trip time value for a signal generated by an access point and received by the device 20, and/or the like. The sensor fingerprint may be used in coordination with an existing positioning map (e.g., a two-dimensional positioning map, an altitude-based three-dimensional positioning map, a floor name-based three-dimensional positioning map that is being developed and/or built, and/or other positioning map) to determine a horizontal plane component and/or vertical component of the device's 20 location when the one or more measurements of the data sample were captured. For example, the one or more sensors may capture image data corresponding to the device's 20 surroundings and the horizontal plan component of the location of the device 20 when the one or more measurements of the data sample may be determined via visual odometry. Various other information/data may be captured (e.g., via the one or more sensors 30) and/or provided via user input (e.g., via the user interface 28) that may enable the determination of the horizontal plane component and/or the vertical component of the location of the device 20 when the one or more measurements of the data sample were captured, in various embodiments.

At block 720, the data sample is provided. For example, the data sample comprising the one or more measurements, a vertical component of the location of the device 20 when the one or more measurements were captured and/or obtained, and, possibly, a horizontal plane component and/or information/data that enables determining the horizontal plane component of the device 20 when the one or more measurements were captured and/or obtained is provided. For example, the device 20 may provide the data sample. For example, the device 20 may comprise means, such as processor 22, memory 24, communications interface 26, and/or the like, for providing the data sample. In various embodiments, the data sample is provided (e.g., transmitted) via the one or more wired and/or wireless networks 50. For example, the data sample may be provided such that a network device 10 receives and/or obtains the data sample. In an example embodiment, a device 20 may provide an individual data sample or provide a batch of data samples (e.g., a plurality of data samples captured and/or obtained over the course of a minute, a plurality of minutes, half an hour, an hour, a day, a week, and/or the like) in an instance of providing data samples.

FIG. 8 provides a flowchart illustrating various processes, procedures, operations, and/or the like for generating, building, updating, and/or the like a positioning map that enables positioning of devices wherein the vertical component of the location of the device is provided as a floor name for a building and/or venue floor and/or level of where the device is located. Starting at block 810, a plurality of data samples are obtained and/or received. For example, a network device 10 may obtain and/or receive a plurality of data samples. For example, the network device 10 may comprise means, such as processor 12, memory 14, communications interface 16, and/or the like for obtaining and/or receiving a plurality of data samples. In various embodiments, the plurality of data samples are accessed from memory 14 (e.g., a data sample database stored in memory 14). In various embodiments, the plurality of data samples are received via communications interface 16.

In various embodiments, a data sample of the plurality of data samples comprises one or more measurements associated with a respective device 20. In an example embodiment, the one or more measurements of the data sample have been aggregated into a sensor fingerprint. In various embodiments, the one or more sensor measurements and/or sensor fingerprint may identify one or more access points observed by the device, indicate a signal strength of a signal generated by an access point and received by the device, indicating a one way or round trip time value for a signal generated by an access point and received by the device, and/or the like. For example, for one or more observed access points that are cellular network cells, the sensor fingerprint may include global and/or local identifiers configured to identify the one or more access points observed and, possibly, a signal strength and/or pathloss estimate for an observed signal generated and/or transmitted by a respective access point; timing measurements such as one way and/or round trip timing values, timing advance, and/or other timing measurements for an observed signal generated and/or transmitted by a respective access point; and/or the like. For example, for one or more observed access points that are WLAN access points, the sensor fingerprint may include BSSIDs and/or MAC addresses configured to identify the one or more access points observed and, possibly, a SSID configured to identify a respective access point; a signal strength measurement such as received signal strength index, an Rx level in dBm, and/or other signal strength measurement and/or pathloss estimate for an observed signal generated and/or transmitted by a respective access point; timing measurements such as one way and/or round trip timing values, timing advance, and/or other timing measurements for an observed signal generated and/or transmitted by a respective access point; and/or the like. In an example embodiment, the one or more measurements may comprise image data corresponding to the surroundings of the device 20 and/or feature information/data for one or more features extracted from and/or identified in the image data that may be used for positioning via visual odometry. For example, the one or more measurements may comprise measurements captured by one or more sensors 30 comprising features that may be locally and/or globally unique to the location of the device 20 when the respective one or more measurements were captured.

In various embodiments, a data sample of the plurality of data samples comprises a vertical component of a location of the respective device 20 when the one or more measurements of the data sample were captured. For example, the vertical component may comprise an altitude (e.g., determined by a GNSS sensor and/or altimeter of the one or more sensors 30 of the respective device 20) of the respective device 20 when the one or more measurements of the data sample where captured. For example, the vertical component may include a floor name for a building and/or venue floor and/or level at which the respective device 20 was located when the one or more measurements of the data sample were captured. For example, the vertical component may comprise both an altitude of the respective device 20 when the one or more measurements of the data sample where captured and a floor name for a building and/or venue floor and/or level at which the respective device 20 was located when the one or more measurements of the data sample were captured.

In various embodiments, a data sample of the plurality of data samples comprises a horizontal plane component of a location of the respective device 20 when the one or more measurements of the data sample were captured. For example, the data sample may comprise a latitude and longitude pair indicating the horizontal plane component of the location of the respective device 20 when the one or more measurements of the data sample were captured. In an example embodiment, the data sample may comprise a horizontal plane component of the location of the respective device 20 when the one or more measurements of the data sample were captured in a global or local coordinate system.

In various embodiments, a data sample of the plurality of data samples comprises information/data that may be used to determine a horizontal plane component of a location of the respective device 20 when the one or more measurements of the data sample were captured. For example, an interface (e.g., radio interface) of the one or more sensors 30 may observe one or more access points and information/data regarding the observations of the one or more observed access points may be aggregated into a sensor fingerprint identifying one or more access points observed by the device 20, indicating a signal strength of a signal generated by an access point and received by the device 20, indicating a one way or round trip time value for a signal generated by an access point and received by the device 20, and/or the like. The sensor fingerprint may be used in coordination with an existing positioning map (e.g., a two-dimensional positioning map, an altitude-based three-dimensional positioning map, a floor name-based three-dimensional positioning map that is being developed and/or built, and/or other positioning map) to determine a horizontal plane component of the respective device's 20 location when the one or more measurements of the data sample were captured. For example, the data sample may comprise image data corresponding to the device's 20 surroundings may be captured and the horizontal plane component of the location of the device 20 when the one or more measurements of the data sample were captured may be determined via visual odometry. Various other information/data may be included in the data sample that may enable the determination of the horizontal plane component of the location of the respective device 20 when the one or more measurements of the data sample were captured, in various embodiments.

At block 820, sets of data samples are identified based on the format and/or type of the vertical component of the location of the respective device 20 provided in the data sample. For example, a first set of data samples may be generated, created, identified and/or the like that comprises one or more data samples of the plurality of data samples that each include the floor name for the building and/or venue floor and/or level at which the respective device 20 was located on when the one or more measurements of the respective data sample were captured. For example, a second set of data samples may be generated, created, identified, and/or the like that comprises one or more data samples of the plurality of data samples that each include both (a) the altitude of the respective device when the one or more measurements of the data sample were captured and (b) the floor name for the building and/or venue floor and/or level at which the respective device 20 was located on when the one or more measurements of the respective data sample were captured. For example, a third set of data samples may be generated, created, identified, and/or the like that comprises one or more data samples of the plurality of data samples that each include the altitude of the respective device when the one or more measurements of the data sample were captured. In an example embodiment, the first set of data samples consists of the data samples that provide the vertical component of the location of the respective device 20 (when the one or more measurements of the respective data sample were captured) as a floor name for the building and/or venue floor and/or level at which the respective device 20 was located on when the one or more measurements of the respective data sample were captured. In an example embodiment, the second set of data samples consists of the data samples that provide the vertical component of the location of the respective device 20 (when the one or more measurements of the respective data sample were captured) as both (a) the altitude of the respective device when the one or more measurements of the data sample were captured and (b) the floor name for the building and/or venue floor and/or level at which the respective device 20 was located on when the one or more measurements of the respective data sample were captured. In an example embodiment, the third set of data samples consists of the data samples that provide the vertical component of the location of the respective device 20 (when the one or more measurements of the respective data sample were captured) as the altitude of the respective device when the one or more measurements of the data sample were captured.

At block 830, a grid of horizontal reference positions may be defined. In an example embodiment, block 830 may be performed prior to the performance of block 810. For example, the network device 10 may define a grid of horizontal reference positions. For example, the network device 10 may comprise means, such as processor 12, memory 14, and/or the like, for defining a grid of horizontal reference positions. In various embodiments, the grid of horizontal reference positions 402 may be defined as a uniform grid with each horizontal reference position being evenly spaced from each of its nearest neighbors. For example, a grid may be defined of horizontal reference points 402 in rows and columns across a surface corresponding to the Earth's surface with each horizontal reference point being a distance d from each of its closest neighbors. For example, the distance d may be one meter, two meters, five meters, ten meters, twenty meters, thirty meters, forty meters, fifty meters, sixty meters, seventy meters, one hundred meters, five hundred meters, and/or the like. In various geographic areas, the distance d may have a different value. In various embodiments, the grid of horizontal reference positions may not be uniform. For example, a horizontal reference point 402 may be associated with a building or venue. For example, the geographic domain defined for a horizontal reference position may corresponding to at least a portion of the footprint of a building or venue. In another example, the grid of horizontal reference points 402 may be formatted based at least in part on the topology and/or geography of the corresponding geographical area. A geographic domain 406 may be defined for each horizontal reference point 402. For example, in the case of a uniform gird of horizontal reference points 402, the geographic domain 406 of a horizontal reference point 402 may extend to approximately halfway between the horizontal reference point and each of its nearest neighbors. For example, the geographic domains 406 of the horizontal reference points 402 may be defined to be uniform and/or consistent, in an example embodiment. In another example, the geographic domain 406 of a horizontal reference point 402 is defined to correspond to at least a portion of the building footprint of a building and/or venue within which the horizontal reference point 402 is located. In an example embodiment, the geographic domain 406 of the horizontal reference positions 402 is defined based at least in part on the topology and/or geography of the geographic area where the horizontal reference positions 402 are located.

At block 840, a discrete vertical axis is determined and/or defined for at least one horizontal reference position. For example, the network device 10 may determine and/or defined for at least one horizontal reference position. For example, the network device 10 may comprise means, such as processor 12, memory 14, and/or the like, for determining and/or defining a discrete vertical axis for at least one horizontal reference position. In an example embodiment, the discrete vertical axis for the at least one horizontal reference position is determined and/or defined based on results of analyzing at least the first set of data samples. In an example embodiment, the discrete vertical axis for the at least one horizontal reference position is determined and/or defined based on results of analyzing at least the first set of data samples and/or second set of data samples. For example, the data samples of at least the first set of data samples may each be associated with a horizontal reference position. For example, the horizontal plane component of the location of the respective device 20 when the one or more measurements of the respective data sample may be determined and/or accessed. The geographic domain within which the horizontal plane component is located may be determined and the data sample may be associated with the horizontal reference position corresponding the geographic domain which the horizontal plane component is located. The data samples of the first data set (and possibly second data set) associated with a first horizontal reference position may be analyzed to determine and/or define a discrete vertical axis for the first horizontal reference position. For example, the data samples of the first data set (and possibly second data set) associated with a first horizontal reference position may be analyzed to identify a number of floors and/or levels of a building and/or venue having a footprint including the first horizontal reference position.

For example, the data samples of the first data set (and possibly second data set) associated with a first horizontal reference position may be analyzed to identify floor names for the floors and/or levels of a building and/or venue having a footprint including the first horizontal reference position. In various embodiments, the order of the floor names for the floors and/or levels of a building and/or venue having a footprint including the first horizontal reference position may be determined based on an analysis of the floor names, an analysis of the second set of data samples, and/or the like. For example, it may be expected that a floor name including a letter and/or abbreviation corresponding to basement in the local language indicates a floor name located at the bottom of a building. For example, floor B1 may be expected to be located below a lobby level, ground floor, first floor, and/or the like. For example, floor B2 may be expected to be located below floor B1. In another example, floor F5 may be expected to be located above floor F4 and below floor F6. Thus, a discrete vertical axis may be determined and/or defined comprising a number of levels equal to the number of floors and/or levels of a building and/or venue having a footprint including the first horizontal reference position with the levels labeled by the respective floor names for the building and/or venue having a footprint including the first horizontal reference position. Similarly discrete vertical axes may be determined and/or defined for second, third, etc. horizontal reference positions based on analysis of data samples of the first set (and possibly second set) of data sample associated with the respective horizontal reference position.

At block 850, a floor name—altitude relation is determined and/or defined for at least one horizontal reference position. For example, a network device 10 may determine and/or define a floor name—altitude relation for at least one horizontal reference position. For example, the network device 10 may comprise means, such as processor 12, memory 14, and/or the like, for determining and/or defining a floor name—altitude relation for at least one horizontal reference position. The data samples of the second data set associated with a first horizontal reference position may be analyzed to determine and/or define a floor name—altitude relation for the first horizontal reference position. For example, the data samples of the second data set each comprise a vertical component including a floor name and an altitude of the location of the respective device 20 when the one or more measurements of the respective data sample were captured. Based on an analysis of the vertical component of the data samples of the second set of data samples associated with the first horizontal reference position, a floor name—altitude relation for the first horizontal reference position that enables transformation, mapping, and/or the like between a given altitude and a corresponding level on the discrete vertical axis for the first horizontal reference position, and/or between a given level on the discrete vertical axis for the first horizontal reference position and a corresponding altitude or range of altitudes. In an example embodiment, the analysis of the data samples of the second set of data samples associated with the first horizontal reference position is performed based at least in part on the discrete vertical axis defined and/or determined for the first horizontal reference position. For example, an altitude and/or range of altitudes corresponding to one or more of the levels of the discrete vertical axis for the first horizontal reference position may be determined and/or defined based on an analysis (e.g., a statistical and/or clustering analysis) of the second set of data samples associated with the first horizontal reference position and/or the third set of data samples associated with the first horizontal reference position. For example, the altitudes provided by the data samples of the second set of data samples associated with the first horizontal reference point that include a first floor name may be analyzed to determine an altitude or range of altitudes corresponding tot the first floor name. In another example, the altitudes provided by the data samples of the second and/or third set of data samples associated with the first horizontal reference position may be analyzed via a clustering method to identify clusters of altitudes at which measurements were captured and each cluster of altitudes may be associated with a level of the discrete vertical axis (and therefore with a floor name) based on the ordering of the clusters of altitudes along a continuous vertical axis. Thus, a relation between the floor names for the building and/or venue located at the horizontal reference position and corresponding altitudes may be determined and/or defined. Similarly floor name—altitude relations may be determined and/or defined for second, third, etc. horizontal reference positions based on analysis of data samples of the second (and possibly first and/or third) set of data sample associated with the respective horizontal reference position.

At block 860, a continuous vertical axis is determined and/or defined for at least one horizontal reference position. For example, the network device 10 may determine and/or define a continuous vertical axis for at least one horizontal reference position. For example, the network device 10 may comprise means, such as processor 12, memory 14, and/or the like for determining and/or defining a continuous vertical axis for at least one horizontal reference position. In an example embodiment, the continuous vertical axis for the at least one horizontal reference position is determined and/or defined based on results of analyzing at least the third set of data samples. In an example embodiment, the continuous vertical axis for a first horizontal reference position is determined and/or defined based on results of analyzing at least the data samples of the third set of data samples and/or second set of data samples that are associated with the first horizontal reference position. For example, the data samples of the third data set (and possibly second data set) associated with a first horizontal reference position may be analyzed to identify a range of altitudes present in the data samples associated with the first horizontal reference position. For example, the data samples of the third data set (and possibly second data set) associated with a first horizontal reference position may be analyzed to identify a range of altitudes that describe the floors and/or levels of a building and/or venue having a footprint including the first horizontal reference position. In an example embodiment, the continuous vertical axis for the first horizontal reference position may be determined and/or defined as a continuous axis starting at the lowest altitude of the range of altitudes and extending to the highest altitude of the range of altitudes. Similarly, continuous vertical axes may be determined and/or defined for second, third, etc. horizontal reference positions based on analysis of data samples of the third set (and possibly second set) of data sample associated with the respective horizontal reference position.

At block 870, one or more measurements and/or sensor fingerprints may be associated with one or more points on a corresponding discrete vertical axis and/or continuous vertical axis. For example, the network device 10 may associate one or more measurements and/or sensor fingerprints with one or more points on a corresponding discrete vertical axis and/or continuous vertical axis. For example, the network device 10 may comprise means, such as processor 12, memory 14, and/or the like for associating one or more measurements and/or sensor fingerprints with one or more points on a corresponding discrete vertical axis and/or continuous vertical axis. For example, a data sample comprises one or more measurements. In an example embodiments, the one or more measurements are aggregated into a sensor fingerprint. The device 20 may aggregate the one or more measurements into a sensor fingerprint and the data sample may comprise the sensor fingerprint and/or the network device 10 may aggregate the one or more measurements into the sensor fingerprint. The data sample is associated with a horizontal reference position, as described above, and a vertical component of a location of the device 20 when the one or more measurements were captured. The one or more measurements and/or the sensor fingerprint corresponding to the data sample may be associated with a point on the discrete vertical axis and/or the continuous vertical axis of the horizontal reference position with which the data sample is associated. For example, the one or more measurements and/or the sensor fingerprint may be associated with an altitude on the continuous vertical axis for the horizontal reference position with which the data sample is associated. For example, the one or more measurements and/or sensor fingerprint may be associated with a level of the discrete vertical axis for the horizontal reference position with which the data sample is associated.

In an example embodiment, the one or more measurements and/or sensor fingerprints of the data samples may be used to generate and/or update one or more access point models. For example, the network device 10 may generate and/or update one or more access point models based on one or more measurements and/or sensor fingerprints provided by data samples. In various embodiments, an access point model comprises a two-dimensional and/or three-dimensional position and/or location of the corresponding access point (e.g., a horizontal plane component and possibly an altitude and/or floor name as the vertical component), and a description and/or representation of the expected coverage area of the access point. For example, the access point model may describe the coverage area within which signals generated and/or transmitted by the access point are expected to be observable. An example access point model comprises a signal strength image representing the expected signal strength field of signals generated and/or transmitted by the access point. The access point model may be associated and/or linked to one or more levels of the discrete vertical axis for a horizontal reference position where, according the access point model, the corresponding access point is observable. The access point model may be associated and/or linked to one or more points of the continuous vertical axis for a horizontal reference position corresponding to altitudes where, according the access point model, the corresponding access point is observable.

At block 880, a venue map may be annotated based on a discrete vertical axis for a horizontal reference position located within the footprint of the corresponding venue. For example, the network device 10 may annotate a venue map based on the discrete vertical axis for a horizontal reference position located within the footprint of the corresponding venue. For example, the network device 10 may comprise means, such as processor 12, memory 14, and/or the like, for annotating a venue map based at least in part on a discrete vertical axis for a horizontal reference position located within the footprint of the corresponding venue. For example, a venue map for a venue may be generated. The level labels 412 of a discrete vertical axis 410 for a horizontal reference position located within the footprint of the corresponding venue may then be used to annotate the levels of the venue map. For example, based at least in part on the discrete vertical axis, the venue map may be annotated with a floor level count for the venue, floor names and/or altitudes of the floors and/or levels of the venue, and/or the like. In an example embodiment, venue map may also be updated and/or annotated to include one or more access points models corresponding to access points located at the venue and/or observable within the venue. For example, the venue map may be updated and/or annotated to include one or more coverage areas, access point locations, and/or the like for one or more access points located at and/or observable at the venue.

In various embodiments, the determined and/or defined discrete vertical axes, floor name—altitude relations, and/or continuous vertical axes may be stored (e.g., in memory 14) in association with the corresponding horizontal reference positions. For example, a positioning map comprising the horizontal reference positions and the corresponding may discrete vertical axes, floor name—altitude relations, and/or continuous vertical axes may be stored as and/or as part of a geographical database, for example, in memory 14. In an example embodiment, one or more annotated venue maps may be stored, possibly as part of a geographic database and/or positioning map, in memory 14. For example, the network device 10 may store the determined and/or defined discrete vertical axes, floor name—altitude relations, and/or continuous vertical axes in association with the corresponding horizontal reference positions, possibly as part of a positioning map and/or geographical database, and/or an annotated venue map. For example, the network device 10 may comprise means, such as processor 12, memory 14, and/or the like, for storing determined and/or defined discrete vertical axes, floor name—altitude relations, and/or continuous vertical axes in association with the corresponding horizontal reference positions, possibly as part of a positioning map and/or geographical database, and/or an annotated venue map. In an example embodiment, the network device 10 may use the determined and/or defined discrete vertical axes, floor name—altitude relations, and/or continuous vertical axes in association with the corresponding horizontal reference positions; positioning map; and/or an annotated venue map to perform) one or more positioning-related or navigation-related functions.

In an example embodiment, the network device 10 may provide at least a portion of the positioning map and/or annotated venue map. For example, the network device 10 may comprise means, such as processor 12, memory 14, communications interface 16, and/or the like for providing at least a portion of the positioning map and/or annotated venue map. For example, the at least a portion of the positioning map and/or annotated venue map may be provided (e.g., via one or more wired and/or wireless networks 50) such that one or more devices 20 may receive the at least a portion of the positioning map and/or annotated venue map. For example, a device 20 may receive the at least a portion of the positioning map and/or annotated venue map (e.g., via communications interface 26), store the at least a portion of the positioning map and/or annotated venue map (e.g., in memory 24), and possibly use the at least a portion of the positioning map and/or annotated venue map to perform (e.g., via processor 22) one or more offline positioning-related or navigation-related functions using information/data of the at least a portion of the positioning map and/or annotated venue map.

C. Providing a Location Estimate Comprising a Floor Name

In various embodiments, a location of a device 20 may be determined using a positioning map that enables positioning of devices with the vertical component of the location of the device comprising a floor name for a building and/or venue floor and/or level of where the device is located. For example, a location of the device 20 may be determined and the vertical component of the location may be provided as the floor name for the building and/or venue floor and/or level of where the device is located. For example, a device 20 may generate a positioning request and provide the positioning request (e.g., via an application program interface (API)). In various embodiments, the positioning request may be provided such that a network device 10 receives the positioning request and determines the location of the device 20. In various embodiments, the device 20 may store at least a portion of the positioning map (e.g., in memory 24) and the device 20 may process the positioning request to determine a location of the device 20.

In various embodiments, the positioning request comprises a sensor fingerprint. For example, a sensor fingerprint may be generated by aggregating one or more sensor measurements. In an example embodiment, the sensor fingerprint is generated by aggregating one or more sensor measurements corresponding to observation of one or more access points. In various embodiments, the sensor fingerprint may identify one or more access points observed by the device, indicate a signal strength of a signal generated by an access point and received by the device, indicating a one way or round trip time value for a signal generated by an access point and received by the device, and/or the like. For example, for one or more observed access points that are cellular network cells, the sensor fingerprint may include global and/or local identifiers configured to identify the one or more access points observed and, possibly, a signal strength and/or pathloss estimate for an observed signal generated and/or transmitted by a respective access point; timing measurements such as one way and/or round trip timing values, timing advance, and/or other timing measurements for an observed signal generated and/or transmitted by a respective access point; and/or the like. Various other sensor fingerprints may be used in various embodiments. For example, a sensor fingerprint may comprise information/data regarding one or more features identified from image data corresponding to a digital image of the device's 20 surroundings.

In various embodiments, the positioning map may be queried based at least in part on the sensor fingerprint to generate at least one position estimate. In an example embodiment, the positioning map is queried based at least in part on the sensor fingerprint to generate a first position estimate determined using the discrete vertical axis for a horizontal reference position that comprises a geographic domain that corresponds to the horizontal plane component of the first position estimate. The positioning map may be further queried based at least in part on the sensor fingerprint to generate a second position estimate determined using the continuous vertical axis and the floor name—altitude relation for the horizontal reference position that comprises a geographic domain that corresponds to the horizontal plane component of the second position estimate. In various embodiments, when it is determined that the first and second positioning estimates match (e.g., provide the same floor name), a location estimate is generated based on the first and/or second positioning estimate. The location estimate is a three-dimensional location provided by a horizontal plane component and a vertical component that comprises the determined floor name. The horizontal plane component may be provided as latitude and longitude pair, street address, point of interest (POI) name, building and/or venue name, and/or the like. When it is determined that the first and second positioning estimates do not match (e.g., the first and second positioning estimates include different floor names), one of the first positioning estimate and the second positioning estimate may be selected, based on a confidence measure and/or the like, and the location estimate may be generated based on the selected one of the first and second positioning estimates. In an example embodiment, when the first and second positioning estimates do not match, an error is returned and/or a location estimate is not generated.

FIG. 9 provides a flowchart illustrating various processes, procedures, operations, and/or the like performed by a device 20, for example, for requesting, receiving, and possibly using a location estimate, according to an example embodiment. Starting at block 910, a sensor fingerprint is captured. For example, the device 20 may capture a sensor fingerprint. For example, the device 20 may comprise means, such as processor 22, memory 24, sensors 30, and/or the like for capturing a sensor fingerprint. In various embodiments, the sensor fingerprint is captured by making one or more measurements and/or observations (e.g., of a radio signal), and aggregating the information/data corresponding to the one or more measurements and/or observations to generate the sensor fingerprint.

In various embodiments, the one or more sensor measurements and/or sensor fingerprint may identify one or more access points observed by the device, indicate a signal strength of a signal generated by an access point and received by the device, indicating a one way or round trip time value for a signal generated by an access point and received by the device, and/or the like. For example, for one or more observed access points that are cellular network cells, the sensor fingerprint may include global and/or local identifiers configured to identify the one or more access points observed and, possibly, a signal strength and/or pathloss estimate for an observed signal generated and/or transmitted by a respective access point; timing measurements such as one way and/or round trip timing values, timing advance, and/or other timing measurements for an observed signal generated and/or transmitted by a respective access point; and/or the like. For example, for one or more observed access points that are WLAN access points, the sensor fingerprint may include BSSIDs and/or MAC addresses configured to identify the one or more access points observed and, possibly, a SSID configured to identify a respective access point; a signal strength measurement such as received signal strength index, an Rx level in dBm, and/or other signal strength measurement and/or pathloss estimate for an observed signal generated and/or transmitted by a respective access point; timing measurements such as one way and/or round trip timing values, timing advance, and/or other timing measurements for an observed signal generated and/or transmitted by a respective access point; and/or the like. In an example embodiment, the one or more measurements may comprise image data corresponding to the surroundings of the device 20 and/or feature information/data for one or more features extracted from and/or identified in the image data that may be used for positioning via visual odometry.

At block 920, a positioning request is generated and provided. For example, the device 20 may generate and provide a positioning request. For example, the device 20 may comprise means, such as processor 22, memory 24, communications interface 26, and/or the like for generating and providing a positioning request. In various embodiments, the positioning request comprises the sensor fingerprint. For example, the device 20 may provide (e.g., transmit via one or more wired and/or wireless networks 50) the positioning request such that a network device 10 receives the positioning request. In an example embodiment, the device 20 may provide the positioning request via an API call to a cloud-based service. In an example embodiment, the device 20 may process the positioning request to determine the location of the device 20 in an offline manner.

At block 930, the location estimate is obtained. For example, the device 20 may obtain the location estimate. For example, the device 20 may comprise means, such as processor 22, memory 24, communications interface 26, and/or the like for obtaining the location estimate. For example, the device 20 may generate the location estimate locally in an example embodiment (e.g., via the execution of application program code and/or the like by processor 22). In an example embodiment, the device 20 may receive a location estimate generated and provided by a network device 10. For example, the device 20 may receive the location estimate via one or more wired and/or wireless networks 50.

At block 940, the location estimate may be provided as input to a positioning-related and/or navigation-related function. For example, the device 20 may perform a positioning-related and/or navigation-related function based at least in part on the location estimate. For example, the device 20 may comprise means, such as the processor 22, memory 24, user interface 28, and/or the like, for performing a positioning-related and/or navigation-related function based at least in part on the location estimate. Some non-limiting examples of positioning-related and/or navigation-related functions include localization, route determination, lane level route determination, operating a vehicle along a lane level route, route travel time determination, lane maintenance, route guidance, lane level route guidance, provision of traffic information/data, provision of lane level traffic information/data, vehicle and/or device trajectory determination and/or guidance, vehicle speed and/or handling control, route and/or maneuver visualization, provision of safety alerts, and/or the like. For example, a route that includes the location estimate as a starting point, ending point, and/or way point may be generated and/or displayed (e.g., via user interface 28). In another example, a map may be displayed (e.g., via user interface 28) that shows the location estimate.

FIG. 10 provides a flowchart illustrating processes, procedures, operations, and/or the like performed by a network device, for example, for determining and providing a location estimate. Starting at block 1002, a positioning request is obtained. For example, the network device 10 may obtain a positioning request. For example, the network device 10 may comprise means, such as processor 12, memory 14, communications interface 16, and/or the like, for obtaining a positioning request. For example, the positioning request may be received via an API call submitted to a cloud-based positioning service. For example, the network device 10 may receive the positioning request via one or more wired and/or wireless networks 50. In various embodiments, the positioning request comprises a sensor fingerprint. In an example embodiment, the positioning request includes a previous location estimate for the device 20. For example, the positioning request may include the most recently determined location estimate for the device 20.

At block 1004, the positioning map is queried based at least in part on the sensor fingerprint. For example, the network device 10 may query the positioning map based at least in part on the sensor fingerprint. For example, the network device 10 may comprise means, such as processor 12, memory 14, and/or the like, for querying the positioning map based at least in part on the sensor fingerprint. In an example embodiment, the positioning map may be queried based at least in part on the previous location of the device 20. In an example embodiment, the sensor fingerprint includes one or more access point identifiers. The positioning map may be queried to identify one or more access point models associated with the one or more access point identifiers of the sensor fingerprint. The identified one or more access point models may then be used to generate one or more positioning estimates. For example, the one or more access point models may provide a description of the coverage areas of the corresponding access points enabling determining a position estimate based on the sensor fingerprint.

For example, at block 1006, a first positioning estimate is determined and/or generated. For example, the network device 10 may determine and/or generate a first position estimate. For example, the network device 10 may comprise means, such as processor 12, memory 14, and/or the like for determining and/or generating a first position estimate. For example, the first position estimate may be determined and/or generated based at least in part on the discrete vertical axis of the horizontal reference position corresponding to a geographic domain comprising the horizontal plane component of the first position estimate. For example, the vertical component of the first position estimate includes a floor name one which the device 20 is expected to be located when the sensor fingerprint was captured. The floor name included in the first position estimate is determined based on the corresponding discrete vertical axis.

For example, at block 1008, a second positioning estimate is determined and/or generated. For example, the network device 10 may determine and/or generate a second position estimate. For example, the network device 10 may comprise means, such as processor 12, memory 14, and/or the like for determining and/or generating a second position estimate. For example, the second position estimate may be determined and/or generated based at least in part on the continuous vertical axis and the floor name—altitude relation of the horizontal reference position corresponding to a geographic domain comprising the horizontal plane component of the second position estimate. For example, the vertical component of the second position estimate includes a floor name for a building and/or venue floor and/or level on which the device 20 is expected to be located when the sensor fingerprint was captured. The floor name included in the second position estimate is determined based on the corresponding continuous vertical axis and floor name—altitude relation. For example, a position estimate may be determined that includes a vertical component that comprises an altitude estimate for the device 20 when the sensor fingerprint was captured. The second position estimate may then be generated and/or determined by using the floor name—altitude relation to determine a floor name for a for a building and/or venue floor and/or level on which the device 20 is expected to be located when the sensor fingerprint was captured.

At block 1010, it is determined whether the first position estimate and the second position estimate match. For example, the network device 10 may determine whether the first position estimate and the second position estimate match. For example, the network device 10 may comprise means, such as processor 12, memory 14, and/or the like, for determining whether the first position estimate and the second position estimate match. For example, the first position estimate and the second position estimate may be determined to match if the vertical components of the first and second position estimates include the same floor name. In an example embodiment, the first position estimate and the second position estimate are determined to match when the horizontal plane components of the first and second position estimates satisfy a distance threshold criteria and the vertical components of the first and second position estimates include the same floor name. For example, the first position estimate and the second position estimate are determined to match when the horizontal plane components of the first and second position estimates are within a distance threshold of each other and the vertical components of the first and second position estimates include the same floor name.

When, at block 1010, it is determined that the first and second position estimates match, the process continues to block 1012. At block 1012, a location estimate is generated and/or determined based on at least one of the first position estimate and the second position estimate. For example, the network device 10 may determine and/or generate a location estimate based on the first and/or second position estimate. For example, the network device 10 may comprise means, such as processor 12, memory 14, and/or the like for determining and/or generating a location estimate based on the first and/or second position estimate. For example, the location estimate may be generated by populating the horizontal plane component with the horizontal plane component of the first or second position estimate, averaging the horizontal plane components of the first and second position estimates, and/or the like. For example, the location estimate may be generated by populating the vertical component with the floor name from the first and/or second position estimates. Thus, a location estimate is determined for the location of the device 20 when the sensor fingerprint was captured that includes the floor name for a building and/or venue floor and/or level.

At block 1014, a positioning-related and/or navigation-related function may be performed based at least in part on the location estimate. For example, the network device 10 may perform a positioning-related and/or navigation-related function based at least in part on the location estimate. For example, the network device 10 may comprise means, such as processor 12, memory 14, and/or the like, for performing a positioning-related and/or navigation-related function. For example, a route may be determined that includes the location estimate as a starting point, ending point, way point, and/or the like. For example, the location estimate may be provided as an input to the positioning-related and/or navigation-related function.

At block 1016, the location estimate and a result of any performed positioning-related and/or navigation-related function performed based at least in part on the location estimate are provided. For example, the network device 10 may provide the location estimate and a result of any performed positioning-related and/or navigation-related function performed based at least in part on the location estimate. For example, the network device 10 may comprise means, such as processor 12, memory 14, communications interface 16, and/or the like, for providing the location estimate and a result of any performed positioning-related and/or navigation-related function performed based at least in part on the location estimate. For example, the location estimate and a result of any performed positioning-related and/or navigation-related function performed based at least in part on the location estimate may be provided (e.g., transmitted) via one or more wired and/or wireless networks such that the device 20 receives the location estimate and a result of any performed positioning-related and/or navigation-related function performed based at least in part on the location estimate.

When at block 1010, it is determined that the first and second position estimates do not match (e.g., include different floor names and/or the like), the process continues from block 1010 to block 1018. At block 1018, one of the first position estimate or the second position estimate are selected. For example, a confidence measure for the first position estimate may be determined based on the quality and/or number of data samples used to generate the discrete vertical axis. For example, a confidence measure for the second position estimate may be determined based on the quality and/or number of data samples used to generate the floor name—altitude relation. The position estimate having the confidence measure indicating a higher confidence is selected. In an example embodiment, the confidence measure may be a relative confidence measure rather than an absolute confidence measure. For example, the network device 10 may select one of the first position estimate or the second position estimate based on, for example, a confidence measure. For example, the network device 10 may comprise means, such as processor 12, memory 14, and/or the like for selecting one of the first position estimate or the second position estimate based on, for example, a confidence measure. In some embodiments, when it is determined that the first and second position estimates do not match, an error message may be generated and provided and/or a location estimate may not be determined.

At block 1020, a location estimate is determined and/or generated based on the selected position estimate. For example, the network device 10 may determine and/or generate a location estimate based on the selected one of the first or second position estimate. For example, the network device 10 may comprise means, such as processor 12, memory 14, and/or the like for determining and/or generating a location estimate based on the selected one of the first or second position estimate. For example, the location estimate may be generated by populating the horizontal plane component with the horizontal plane component of the selected position estimate and/or the like. For example, the location estimate may be generated by populating the vertical component with the floor name from the selected position estimate. The process may then continue to block 1014 or 1016.

In various scenarios only one of the first or second position estimate may be generated. For example, one of the first or second position estimate may not be generated successfully due to, for example, insufficient learning of the positioning map at the horizontal reference position, not enough fingerprints associated with floor names having been collected in the area, and/or the like. In various embodiments, if only one of the first or second position estimate is successfully generated, the location estimate may be determined and/or generated based on the one of the first or second position estimate that as successfully generated.

III. Technical Advantages

Various embodiments provide technical solutions to the technical problems of generating positioning and/or venue maps that include the floor names for the building and/or venue floors and/or levels. As described above, when determining a position or location of a device within a building and/or at a venue, it may be desired to provide the vertical component of a device's position and/or location as a floor and/or level name of a building and/or venue that the device was located on when the device generated and/or provided a positioning request. However, floor and/or level names are not consistent between various buildings and/or venues and the number of buildings and/or venues within a geographical area results in manual determination and entry of floor and/or level names for individual buildings and/or venues being untenable. Various embodiments described herein therefore address the technical problems of determining floor and/or level names for one or more buildings and/or venues and generating/updating positioning maps that include discrete vertical axes and/or floor name—altitude relations for one or more horizontal reference positions that may be used to determine a position and/or location of a device where the vertical component of the position and/or location is provided by a floor and/or level name (rather than and/or in addition to an altitude and/or the like). Various embodiments described herein further address the technical problem of using a positioning map that includes discrete vertical axes and/or floor name—altitude relations for one or more horizontal reference positions to determine and/or provide a position and/or location that includes a vertical component given as a floor and/or level name. Thus, various embodiments provide technical improvements to the fields of map generation and/or updating, and device positioning.

IV. Example Apparatus

The network device 10 and/or device 20 of an example embodiment may be embodied by or associated with a variety of computing devices including, for example, a navigation system including an in-vehicle navigation system, a vehicle control system, a personal navigation device (PND) or a portable navigation device, an advanced driver assistance system (ADAS), a global navigation satellite system (GNSS), a cellular telephone, a mobile phone, a personal digital assistant (PDA), a watch, a camera, a computer, and/or other device that can perform positioning and/or navigation-related functions, such as digital routing and map display. Additionally or alternatively, the network device 10 and/or device 20 may be embodied in other types of computing devices, such as a server, a personal computer, a computer workstation, a laptop computer, a plurality of networked computing devices or the like, that are configured to update one or more map tiles, analyze probe points for route planning or other purposes, store and/or provide driving condition information/data, generate and provide sensor quality index tables and/or driving condition tables, and/or the like. In an example embodiment, a device 20 is a smartphone, tablet or other mobile device and a network device 10 is a server. In an example embodiment, a device 20 is an apparatus configured to provide a user with a route (e.g., via user interface 28).

In some embodiments, the processor 12, 22 (and/or co-processors or any other processing circuitry assisting or otherwise associated with the processor) may be in communication with the memory device 14, 24 via a bus for passing information among components of the apparatus. The memory device may be non-transitory and may include, for example, one or more volatile and/or non-volatile memories. In other words, for example, the memory device may be an electronic storage device (e.g., a non-transitory computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the network device 10 and/or device 20 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12, 22 may be embodied in a number of different ways. For example, the processor 12, 22 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 12, 22 may include one or more processing cores configured to perform independently. A multi-core processor may enable multiprocessing within a single physical package. Additionally or alternatively, the processor 12, 22 may include one or more processors configured in tandem via the bus to enable independent execution of instructions, pipelining and/or multithreading.

In an example embodiment, the processor 12, 22 may be configured to execute instructions stored in the memory device 14, 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the network device 10 and/or device 20 may include a user interface 18, 28 that may, in turn, be in communication with the processor 12, 22 to provide output to the user, such as one or more navigable routes through a road network and/or venue, one or more notifications regarding traffic conditions along at least a portion of a route, and/or the output of one or more other navigation functions, and, in some embodiments, to receive an indication of a user input. As such, the user interface 18, 28 may include one or more output devices such as a display, speaker, and/or the like and, in some embodiments, may also include one or more input devices such as a keyboard, a mouse, a joystick, a touch screen, touch areas, soft keys, a microphone, a speaker, or other input/output mechanisms.

Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor 12, 22 (e.g., memory device 14, 24 and/or the like).

The network device 10 and/or device 20 may optionally include a communication interface 16, 26. The communication interface 16, 26 may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In addition to embodying the network device 10 and/or device 20 of an example embodiment, a navigation system may also include or have access to a geographic database. For example, in various embodiments, a network device 10 and/or device 20 may comprise a component (e.g., memory 14, 24, and/or another component) that stores a digital map (e.g., in the form of a geographic database) comprising a first plurality of data records, each of the first plurality of data records representing a corresponding TME, wherein at least some of said first plurality of data records map information/data (e.g., the updated map information/data) indicating current traffic conditions along the corresponding TME. For example, the geographic database may include a variety of data (e.g., map information/data) utilized in various navigation functions such as constructing a route or navigation path, determining the time to traverse the route or navigation path, matching a geolocation (e.g., a GNSS determined location) to a point on a map, a lane of a lane network, and/or link, one or more localization features and a corresponding location of each localization feature, and/or the like. For example, a geographic database may include road segment, segment, link, lane segment, or traversable map element (TME) data records, point of interest (POI) data records, localization feature data records, and other data records. More, fewer or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GNSS data associations (such as using known or future map matching or geo-coding techniques), for example. In an example embodiment, the data records may comprise nodes, connection information/data, intersection data records, link data records, POI data records, and/or other data records. In an example embodiment, the network device 10 may be configured to modify, update, and/or the like one or more data records of the geographic database. For example, the network device 10 may modify, update, generate, and/or the like map information/data corresponding to TMEs, links, lanes, road segments, travel lanes of road segments, nodes, intersection, and/or the like and/or the corresponding data records (e.g., to add or update updated map information/data including, for example, current traffic conditions along a corresponding TME), a localization layer (e.g., comprising localization features) and/or the corresponding data records, and/or the like.

In an example embodiment, the TME data records are links, lanes, or segments (e.g., maneuvers of a maneuver graph, representing roads, travel lanes of roads, streets, or paths, as can be used in the calculated route or recorded route information for determination of one or more personalized routes). The intersection data records are ending points corresponding to the respective links, lanes, or segments of the TME data records. The TME data records and the intersection data records represent a road network, such as used by vehicles, cars, bicycles, and/or other entities. Alternatively, the geographic database can contain path segment and intersection data records or nodes and connection information/data or other data that represent pedestrian paths or areas in addition to or instead of the vehicle road record data, for example.

The TMEs, lane/road/link segments, segments, intersections, and/or nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include and/or be associated with event data (e.g., traffic incidents, constructions, scheduled events, unscheduled events, etc.) associated with the POI data records or other records of the geographic database.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases. Regardless of the manner in which the databases are compiled and maintained, a navigation system that embodies a network device 10 and/or device 20 in accordance with an example embodiment may determine the time to traverse a route that includes one or more turns at respective intersections more accurately.

V. Apparatus, Methods, and Computer Program Products

As described above, FIGS. 5, 6, 7, 8, 9, and 10 illustrate flowcharts of a network device 10 and/or device 20, methods, and computer program products according to an example embodiment of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14, 24 of an apparatus employing an embodiment of the present invention and executed by the processor 12, 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
    obtaining, by one or more processors, one or more of (i) an audio sample captured by an audio sensor associated with a device or (ii) image data captured by an image sensor associated with the device, the image data comprising a representation of one or more elevator buttons;
    analyzing, by the one or more processors, one or more of (i) the audio sample to identify a floor name indicator in the audio sample or (ii) the image data to identify an activated elevator button from among the one or more elevator buttons represented by the image data;
    determining, by the one or more processors, a floor name based on one or more of the following: (i) the floor name indicator identified in the analyzed audio sample or (ii) a floor name indicator associated with the identified activated elevator button in accordance with the analyzed image data; and
    storing or providing, by the one or more processors, the determined floor name for positioning purposes.

2. The method of claim 1, further comprising associating the determined floor name with a horizontal reference position associated with a horizontal plane component of a location of the device when the one or more of (i) the audio sample or (ii) the image data was captured.

3. The method of claim 2, further comprising providing the determined floor name in association with the horizontal reference position such that a network device receives the floor name in association with the horizontal reference position.

4. The method of claim 1, wherein the analyzing is performed using a machine learning trained floor name identification model.

5. The method of claim 1, further comprising:
    obtaining a sensor fingerprint captured using a sensor associated with the device at a location where the one or more of (i) the audio sample or (ii) the image data was captured; and
    associating the sensor fingerprint or a result of analyzing the sensor fingerprint with the determined floor name.

6. The method of claim 1, further comprising:
    receiving an altitude of the device at a location where the one or more of (i) the audio sample or (ii) the image data was captured; and
    associating the altitude with the determined floor name.

7. The method of claim 1, wherein the audio sample comprises audio of an automated elevator voice.

8. An apparatus comprising at least one processor and at least one memory storing computer program code, the at least one memory and the computer program code are configured to, with the processor, cause the apparatus to at least:
    obtain one or more of (i) an audio sample captured by an audio sensor associated with a device or (ii) image data captured by an image sensor associated with the device, the image data comprising a representation of one or more elevator buttons;
    analyze one or more of (i) the audio sample to identify a floor name indicator in the audio sample or (ii) the image data to identify an activated elevator button from among the one or more elevator buttons represented by the image data;
    determine a floor name based on one or more of the following: (i) the floor name indicator identified in the analyzed audio sample or (ii) a floor name indicator associated with the identified activated elevator button in accordance with the analyzed image data; and
    store or provide the determined floor name for positioning purposes.

9. The apparatus of claim 8, wherein the at least one memory and the computer program code are further configured to, with the processor, cause the apparatus to associate the determined floor name with a horizontal reference position associated with a horizontal plane component of a location of the device when the one or more of (i) the audio sample or (ii) the image data was captured.

10. The apparatus of claim 9, wherein the at least one memory and the computer program code are further configured to, with the processor, cause the apparatus to provide the determined floor name in association with the horizontal reference position such that a network device receives the floor name in association with the horizontal reference position.

11. The apparatus of claim 8, wherein the analyzing is performed using a machine learning trained floor name identification model.

12. The apparatus of claim 8, wherein the at least one memory and the computer program code are further configured to, with the processor, cause the apparatus to:
    obtain a sensor fingerprint captured using a sensor associated with the device at a location where the one or more of (i) the audio sample or (ii) the image data was captured; and
    associate the sensor fingerprint or a result of analyzing the sensor fingerprint with the determined floor name.

13. The apparatus of claim 8, wherein the at least one memory and the computer program code are further configured to, with the processor, cause the apparatus to:
- receive an altitude of the device at a location where the one or more of (i) the audio sample or (ii) the image data was captured; and
- associate the altitude with the determined floor name.

14. The apparatus of claim 8, wherein the audio sample comprises audio of an automated elevator voice.

15. A computer program product comprising at least one non-transitory computer-readable storage medium having computer-readable program code portions stored therein, the computer-readable program code portions comprise executable portions configured, when executed by a processor of an apparatus, to cause the apparatus to:
- obtain one or more of (i) an audio sample captured by an audio sensor associated with a device or (ii) image data captured by an image sensor associated with the device, the image data comprising a representation of one or more elevator buttons;
- analyze one or more of (i) the audio sample to identify a floor name indicator in the audio sample or (ii) the image data to identify an activated elevator button from among the one or more elevator buttons represented by the image data;
- determine a floor name based on one or more of the following: (i) the floor name indicator identified in the analyzed audio sample or (ii) a floor name indicator associated with the identified activated elevator button in accordance with the analyzed image data; and
- store or provide the determined floor name for positioning purposes.

16. The computer program product of claim 15, wherein the computer-readable program code portions comprise executable portions configured, when executed by the processor of the apparatus, to cause the apparatus to associate the determined floor name with a horizontal reference position associated with a horizontal plane component of a location of the device when the one or more of (i) the audio sample or (ii) the image data was captured.

17. The computer program product of claim 16, wherein the computer-readable program code portions comprise executable portions configured, when executed by the processor of the apparatus, to cause the apparatus to provide the determined floor name in association with the horizontal reference position such that a network device receives the floor name in association with the horizontal reference position.

18. The computer program product of claim 15, wherein the analyzing is performed using a machine learning trained floor name identification model.

19. The computer program product of claim 15, wherein the computer-readable program code portions comprise executable portions configured, when executed by the processor of the apparatus, to cause the apparatus to:
- obtain a sensor fingerprint captured using a sensor associated with the device at a location where the one or more of (i) the audio sample or (ii) the image data was captured; and
- associate the sensor fingerprint or a result of analyzing the sensor fingerprint with the determined floor name.

20. The computer program product of claim 15, wherein the computer-readable program code portions comprise executable portions configured, when executed by the processor of the apparatus, to cause the apparatus to:
- receive an altitude of the device at a location where the one or more of (i) the audio sample or (ii) the image data was captured; and
- associate the altitude with the determined floor name.

\* \* \* \* \*